United States Patent [19]

Smith

[11] 4,279,032
[45] Jul. 14, 1981

[54] CHANNEL BANK LOOP-AROUND TEST ARRANGEMENT AND METHOD

[75] Inventor: Nicholas K. Smith, Middletown, N.J.

[73] Assignee: Bell Telephone Laboratories, Incorporated, Murray Hill, N.J.

[21] Appl. No.: 33,720

[22] Filed: Apr. 26, 1979

[51] Int. Cl.³ .............................................. H04J 3/14
[52] U.S. Cl. ...................................... 370/15; 370/17; 371/24; 371/27
[58] Field of Search ............... 370/15, 13, 17; 371/24, 371/27; 179/175.3 R

[56] References Cited

U.S. PATENT DOCUMENTS 3,892,923  7/1975  Ranner .................................. 370/15

FOREIGN PATENT DOCUMENTS 2252711  6/1975  France ...................................... 370/15

Primary Examiner—Douglas W. Olms
Attorney, Agent, or Firm—Frederick W. Padden

[57] ABSTRACT

A method of detecting analog signal degradations in channel bank apparatus. The apparatus interconnects a digital PCM line with a plurality of analog trunks by means of multiplex circuitry and a plurality of channel units each comprising a PCM-to-analog signal receive path and an analog-to-PCM signal transmit path. A plurality of sequences of prescribed PCM test code words, wherein each sequence is amplitude plottable against time into a triangularized waveform cycle, are circulated via a loop-around path bridging the receive and transmit paths of a channel unit.

A set of values, each corresponding to a type of analog signal degradation, is derived for each recovered word sequence, based on prescribed amplitude and slope characteristics of its waveform plot, and is averaged over the recovered sequences. If any average characteristic value is not within an expected tolerance of a corresponding prestored expected average value, a defective channel unit indication is displayed.

27 Claims, 16 Drawing Figures

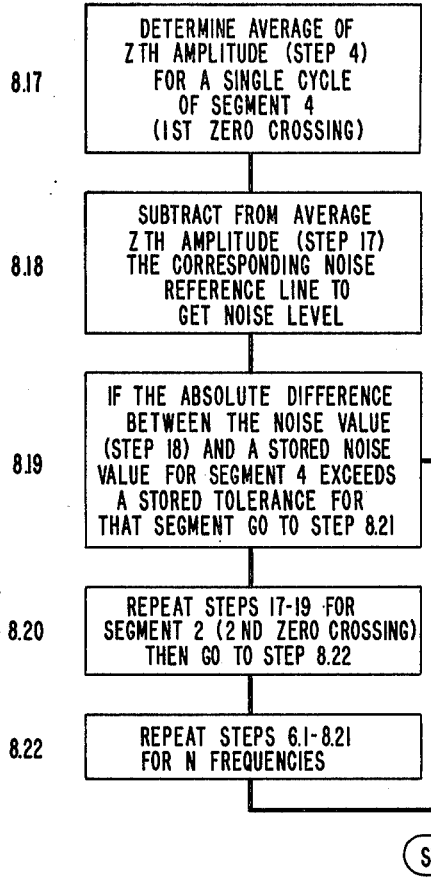

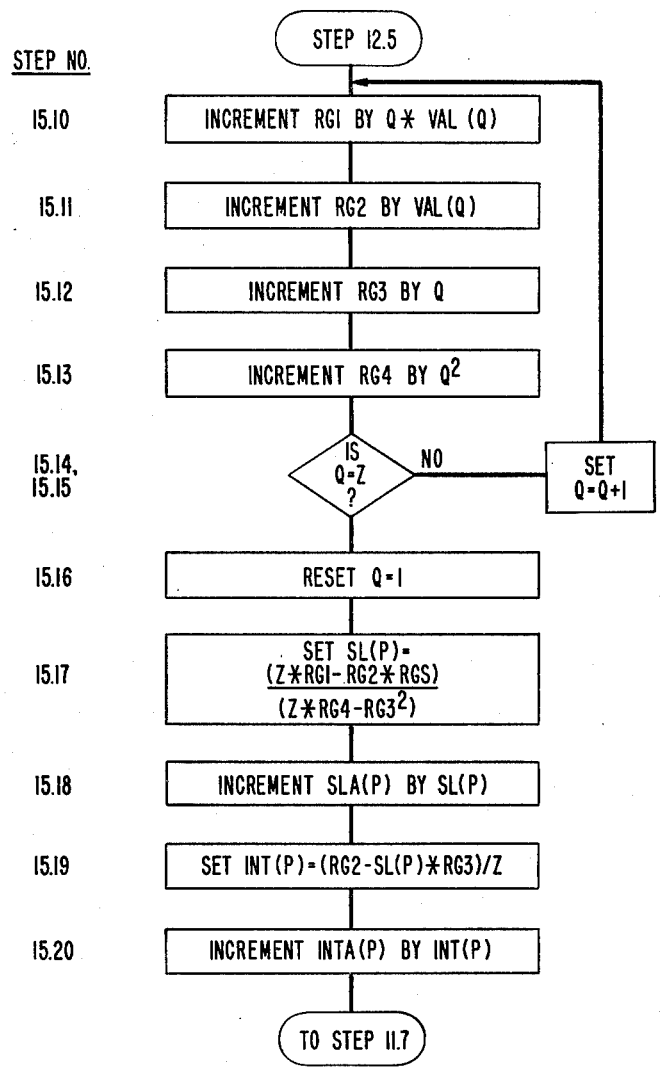
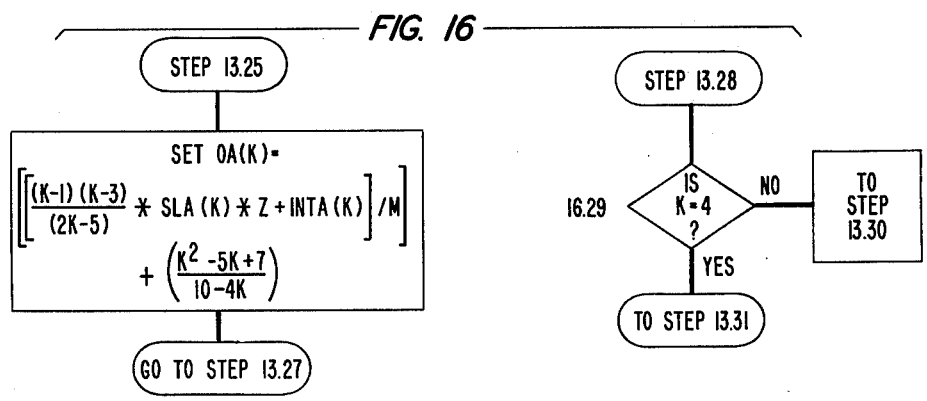

CHANNEL BANK LOOP-AROUND TEST ARRANGEMENT AND METHOD

TECHNICAL FIELD

This invention relates to the testing of pulse code modulation (PCM) apparatus and, more particularly, to a digitally implemented method for automatically detecting analog signal degradations in time division multiplexing channel bank circuitry.

BACKGROUND OF THE INVENTION

Traditionally, in a telephone switching center, time division multiplex lines are interconnected with analog trunks by means of an interface circuit known as a channel bank. Architecturally, a channel bank interconnects one duplex time division multiplex line with a plurality of analog 2-wire trunk lines by means of distinct receive and transmit paths terminated in a like plurality of 4-wire-to-2-wire hybrid transmission circuits. Along its receive path, a channel bank comprises circuits for decoding, demultiplexing, smoothing and level adjusting received PCM signals into continuous analog signals. Conversely, along its transmit path, analog signals appearing at the hybrid circuit are level adjusted, bandlimited, sampled, multiplexed and PCM coded for transmission onto the multiplex line.

Heretofore, much of channel bank testing has been achieved by looping or bridging together the transmit and receive paths on the digital PCM side of the channel bank apparatus. A prescribed analog test signal is applied to the transmit path, looped around in PCM form and recovered as a reconstituted analog signal at the output of the receive path. Comparisons between the prescribed and recovered analog signals for ascertaining various transmission criteria are carried out by means of analog supervisory devices. However, as is well known, such devices, being analog in nature, entail greater expense in comparison with digitally implemented methods of signal comparison and evaluation. Moreover, the use of these analog devices for testing channel banks is technologically incompatible with the use of both digital computer switching processors and digital switches which are proliferating in telephone switching centers.

Recently, in recognition of this problem, channel bank testing has been implemented by another approach. In U.S. Pat. No. 3,892,923 issued to G. Ranner on July 1, 1975, an arrangement is shown wherein the transmit and receive paths of a channel bank are looped or bridged together on the analog, rather than the digital side. A prescribed PCM test signal is applied at the input of the receive path wherealong it is decoded and demultiplexed. The resultant signal is looped around a dedicated analog path preconditioned for testing and is presented directly to the multiplexer and coding circuits of the transmit path. The reencoded PCM signals are recovered and compared, bit for bit, with the prescribed test code signal by means of conventional digital processing techniques.

Although the foregoing arrangement achieves some measure of digitally implemented testing with regard to the coder/decoder and multiplexer/demultiplexer circuitry within the channel bank, it is incapable of testing other portions of the receive and transmit paths of the channel banks. Specifically, the arrangement is deficient in that it cannot send the test code signals, between the demultiplexer and multiplexer, on a loop-around path that also includes the smoothing, band-limiting, and level adjusting subcircuits on the receive and transmit paths. Moreover, not only are such subcircuits excluded in the foregoing arrangement, but in order for bit-for-bit comparison between the prescribed and recovered signals to be successful, the arrangement requires that the loop-around path provided be preconditioned with a special smoothing circuit for testing purposes. Failure to test the aforementioned subcircuits may obscure the results of the test because normal acceptable levels of analog signal degradation may be experienced along the path connecting the aforementioned subcircuits and nevertheless give rise to a bit-for-bit mismatch due to analog-PCM signal resampling delay along the subcircuit path. The foregoing arrangement is further deficient in that it is unable to diagnostically specify the type of analog signal degradation experienced, e.g., amplitude loss, frequency-dependent distortion and background noise.

Accordingly, no prior art method is capable of accurately detecting and diagnosing various types of analog signal degradations in the entire channel bank by employing digitally implemented means.

SUMMARY OF THE INVENTION

The foregoing deficiencies are ameliorated and a technical advance is achieved by my method which provides for automatic generation of a plurality of prescribed PCM test code word sequences and the looping around of these sequences between the transmit and receive paths in the channel bank on the analog side. The method further provides for averaging characteristic values associated with each such looped test code word sequence and displaying an indication that the transmit and receive paths under test are defective if any one of the average characteristic values deviates from a corresponding expected characteristic value by more than a corresponding expected tolerance. In this way the test code word sequences circulated around a loop-around path are evaluated and unacceptable levels of analog signal degradation occurring thereover detected. Moreover, by noting the type of characteristic value that is deviant, this method further enables a digitally-implemented qualitative diagnosis of the nature of the analog signal indication on the loop-around path such as amplitude loss, frequency-dependent distortion or amplitude noise.

My invention is carried out on a PCM channel bank apparatus having a time division multiplex line serving a plurality of PCM channels on the digital side and having a plurality of voicebank trunk lines on the analog side, each corresponding to one of the PCM channels. Each channel unit comprises a receive path for PCM-to-analog signal conversion and a transmit path for analog-to-PCM signal conversion. In the preferred embodiment, the apparatus is arranged such that PCM signals arriving on a given channel of the multiplex line are distributed via a demultiplexer along the receive path of a channel unit and onto the corresponding voiceband trunk line. Similarly, analog signals on the voiceband line are transmitted through a transmit path of the aforementioned channel unit and, via a multiplexer circuit, are reconstituted to a PCM bitstream for transmission over the multiplex line. Conventionally, the channel bank apparatus includes a channel unit control processor coupled to the input of the demultiplexer and to the output of the multiplexer for extracting signaling information from the PCM bitstream and for maintaining channel synchronization.

In order to carry out the generating, averaging and displaying method steps of my invention as will be described below, a channel unit testing controller is provided. Additionally, a code generator coupled between the testing controller and the demultiplexer input and a code receiver coupled between the testing controller and the multiplexer output are provided for injecting generated test code words and for recovering looped test code words, respectively. The loop-around path itself comprises a conventional two-wire to four-wire hybrid transmission circuit bridging the transmit and receive paths of a channel unit and coupling the bridged paths with the corresponding voiceband trunk line.

An alternative embodiment of the loop-around path is provided whereby, by means of a selector circuit coupled to the testing controller, the hybrid circuit of the channel unit under test is disabled and a dedicated loop-around path controlled by logic gates is enabled.

In accordance with the method of my invention, the test code word sequences are circulated from the testing controller via the loop-around path and back to the testing controller. Each sequence of words is generated such that if it were amplitude plotted against time, it would form a triangularized waveform cycle. The characteristic values associated with each test code word sequence are based on amplitude and slope values derived from the corresponding waveform cycle.

The generating step is implemented by means of an accumulator register in the testing controller which is initialized to a first reference value and is iteratively incremented by uniform amplitude step sizes based on the frequency of the waveform cycle amplitude plot. To facilitate the iterative incrementing step, each triangularized waveform cycle is divided into four one-quarter cycle segments, each traversed by one-quarter of the test code words required for traversal of an entire cycle. The words traversing the first and second segments have positive amplitudes, while those traversing the last two segments have negative amplitudes. In addition, the generated words traverse positive-sloped amplitude plots in the first and fourth segments and negative-sloped amplitude plots in the second and third segments. Accordingly, the accumulator register is incremented by the uniform step size during traversal of the first segment, decremented by the step size during traversal of the second and third segments and again incremented during traversal of the fourth segment. After each time that the accumulator register is updated, the value stored therein is encoded into a PCM word and shifted into the code generator in preparation for the looping step.

Preferably, the generation of the test code word sequence is repeated a prescribed number of times, M, for a traversal of M waveform cycles each having a selected cyclical frequency. The generating steps are repeated for each of a prescribed range of frequencies wherein the highest frequency is eight words per cycle and the lowest frequency is $2^{(N+2)}$ words per cycle where N is the number of magnitude bits in a test code word.

During the looping step, the generated test code word sequences are sent via the demultiplexer to the receive path comprising a PCM-to-PAM signal decoder, a lowpass filter for smoothing the PAM signals into continuous analog signals and a gain control circuit for adjusting the amplitude level of these signals. After loop-around of the analog signals via the hybrid circuit, they are presented to the transmit path comprising a second gain control circuit, a band-limiting lowpass filter and a PCM coding circuit. The looped code words are recovered at the code receiver under control of the channel unit control processor and transferred to the testing controller for the implementation of the averaging step.

Advantageously, looped test code words received at the code receiver need not be synchronized, nor compared, with their generated counterparts because the averaging method step is based on the amplitude and slope interrelationship among the looped words traversing a segment rather than on a comparison between looped and generated words.

During the averaging phase of my method, each recovered test code word sequence is buffered into four groups of words, each group traversing one of the cycle segments, and each segment-traversing word group is converted into a corresponding set of amplitude values from which characteristic values are then derived as follows.

The last of each set of amplitude values of a segment is accumulated by the ordinal number of the segment traversed (e.g., first, second, third, etc.) over the M looped waveform cycles having a given frequency. Thereafter, an average slope is determined for the plot of the segment traversed by the looped test code word amplitudes. Consecutive pairs of the set of amplitude values traversing the segment are then differenced so that piecewise slope values are derived for the entire segment. The variance is then found between each piecewise slope value and the average slope for the segment and the sum of these variances is accumulated by segment number over M cycles at the given frequency.

Two alternative methods are provided in my invention for deriving the average slope for a segment. In one embodiment, all the piecewise slopes derived for a segment are averaged to arrive at an average slope. In another embodiment, the slope of a line derived by regression techniques and fitted to a plot of the code word amplitudes traversing the given segment is used as the average slope for the segment.

In either case, when accumulation of the aforementioned last amplitude values and variance sums have been completed, the first set of characteristic values are ready to be determined. Accordingly, the last values accumulated for segment one and for segment three are each averaged respectively over the M cycles for a determination of positive and negative peak amplitude values respectively. These peak amplitude values comprise the first set of characteristic values and are qualitatively indicative of the degree of amplitude loss experienced on the analog loop-around path.

The second set of characteristic values comprises the average positive and negative slope variance values. The values are derived by averaging the accumulated summed variances of the first and fourth segments over M cycles and then repeating the step for the accumulated summed variances for the second and third segments for a determination of average positive and negative slope variance values respectively. These values show the qualitative degree of frequency dependent non-linear distortion experienced by the analog signals during the loop-around stage.

The last set of characteristic values is derived by averaging the accumulated last values of the fourth and second segments respectively, so that zero crossing amplitudes are determined. These zero crossing values correspond to the amplitude value near the point that the amplitude plot traversing the segment crosses or intercepts the zero amplitude axis. The zero crossing values, when measured against appropriate reference values, are indicative of the average noise experienced by analog signals on the loop-around path.

In this way a set of characteristic average values is developed, in turn, for each set of M test code word sequences at each selected frequency from the previously defined range of frequencies. In accordance wity my method, after each characteristic value is ascertained, it is differenced with an expected characteristic value for the given segment number at the given cyclical frequency. The expected values are derived prior to installation of the channel bank apparatus by conventional manual calibration techniques during which test code words are looped around channel units and telephone transmission criteria scrutinized. The preinstallation derived values are prestored in the testing controller. If a derived characteristic value deviates from the expected value by more than an expected tolerance, also derived for the given segment at the given frequency and prestored in the testing controller, then an indication is made by the testing controller that the channel unit under test is defective. These comparisons are repeated for each average characteristic value at each cyclical frequency.

Thus, in accordance with my invention, a digitally implemented method is provided for testing channel units in a channel bank apparatus wherein analog signal degradations on a loop-around path that includes smoothing or filtering, band-limiting and level adjusting subcircuits, are detected are qualitatively diagnosed. Advantageously, the specific illustrative method of testing a PCM channel bank arrangement is characterized by the steps of: circulating from the testing controller via the loop-around path and back to the testing controller a sequence of prescribed PCM test code words with each of those words defining an amplitude magnitude of a waveform having a piecewise linearly positive and negative sloping portion; and evaluating the circulated test code words for undesirable levels of signal degradation. To elaborate, the method is further characterized in that a plurality of sequences of prescribed PCM test code words are circulated and each of the words of each of the sequences defines an amplitude magnitude of a triangularized waveform having piecewise linearly positive and negative sloping portions.

BRIEF DESCRIPTION OF THE DRAWING

The foregoing and other aspects of my invention are more fully understood by a reading of the ensuing description with reference to the drawing in which:

FIG. 6, 7, and 8 show a generalized flow diagram describing the method for receiving and evaluating already-generated test code words;

FIG. 9 in block diagram form shows the memory resident in my testing controller required for the generation of the test code words;

FIG. 14 shows memory required in my testing controller for the implementation of an alternate method of receiving and evaluating test code words; and FIG. 15 and 16 show alternate method steps to be substituted for steps in my detailed flow diagram of FIG. 12 and 13 for the carrying out of my alternate method.

Figure 1:
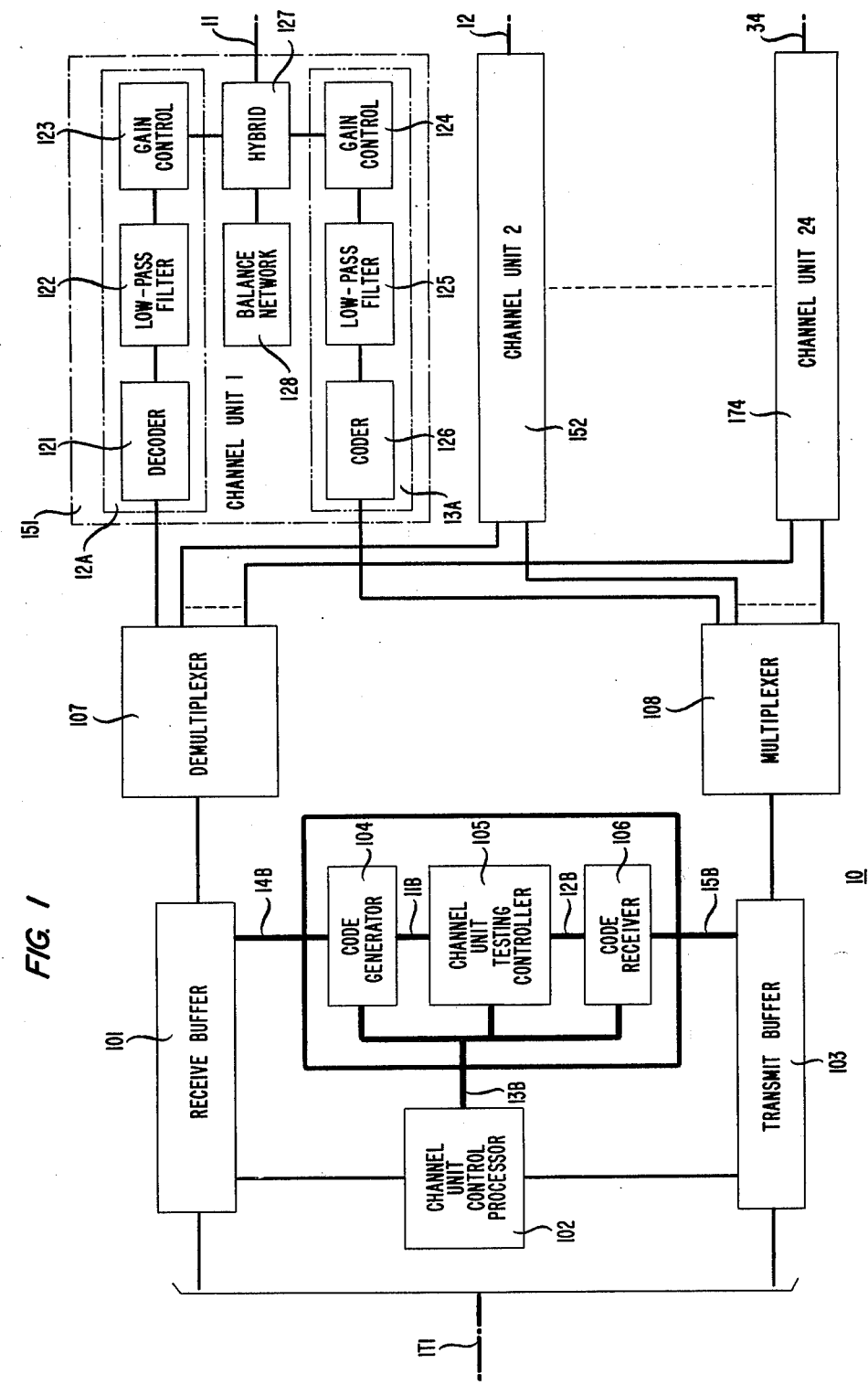
FIG. 1 in block diagram form shows a digital multiplexing arrangement including plurality of channel units, a channel unit control processor, multiplexing equipment, and, in heavy lined block, channel unit testing control apparatus for the implementation of the method of my invention.

In the drawing, each step in a method is preceded by the number of the figure of the drawing in which it appears and a decimal point. For example, step 13.19 appears in FIG. 13 and is the nineteenth step of the method outlined on the flowchart spanning FIG. 12–13.

DETAILED DESCRIPTION

An illustrative digitally multiplexed channel bank communication arrangement is depicted schematically in FIG. 1. As shown therein, a plurality of analog communication lines 11–34 are interconnected by means of channel units 151–174, respectively, to a duplex communication line 1T1 bearing digital PCM encoded speech signals. The PCM signals received on line 1T1 are prepared for conversion to analog form by channel units 151–174 by means of receive buffer 101 and demultiplexer circuit 107. Symmetrically, signals occurring on any one of lines 11–34 are converted from analog to PCM form by means of one of the channel units 151–174 and reconstituted into a T1 bitstream by means of multiplexer 108 and transmit buffer 103. Channel unit control processor 102 provides synchronization timing, extracts PCM signaling information from receive buffer 101, and injects similar information into transmit buffer 103.

Turning to the channel unit structure, FIG. 1 shows each channel unit as having a receive transmission path and a transmit transmission path. Each of these transmission paths interfaces with an analog line by means of a well-known hybrid transmission circuit arrangement. Illustratively, channel unit 151 comprises receive transmission path 12A which includes decoder 121, lowpass filter 122 and gain control circuit 123. The transmit transmission path 13A comprises gain control circuit 124, lowpass filter 125 and coder 126. Both transmission paths are terminated on the hybrid circuit arrangement comprising hybrid circuit 127, balance network 128 and analog line 11. The analog signal degradations due to a defect in a channel unit are detected in accordance with my method by means of a digital loop-around test implemented by the circuitry shown in heavy lined block.

To further elaborate on the channel bank arrangement of FIG. 1, it is assumed that the line 1T1 carries a plurality of multiplexed PCM signals representing speech in accordance with the well-known D2 and D3 PCM format described in the group of articles entitled "D2 Channel Bank," in the *Bell System Technical Journal* of October 1971, Vol. 51, No. 8, pp. 1641–1699, and in the article, "The D3 Channel Bank," by W. B. Gaunt et al, *Bell Laboratories Record*, August 1972, pp. 229–33. In accordance with the PCM format described in the articles, each signaling frame has a duration of 125 microseconds and consists of 193 bits. Each frame comprises 24 eight-bit PCM words representing 24 communication channels, and one framing bit. Thus, incoming PCM signals representing encoded speech samples are received over the T1 line in the D2/D3 format, stored at receive buffer 101, demultiplexed at demultiplexer 107 and distributed via one of the 24 channel units 151-174 to analog lines 11-34. Conversely, the outgoing PCM signals to be transmitted onto line 1T1 comprise speech samples originating from any one of lines 11-34.

The arrangement of the channel bank and multiplex circuitry is similar to the arrangement depicted in the article, "D2 Channel Bank: System Aspects" by H. H. Henning et al, *Bell System Technical Journal*, October 1972, Vol. 51, No. 8, FIG. 2 on page 1650 and accompanying text on pages 1649–1652, wherein both the coding/decoding and multiplexing/demultiplexing circuits are shown as common to all 24 channel units. However, in FIG. 1 herein, the relative arrangements of the coder, decoder, multiplexer, and demultiplexer have been slightly altered so that each channel unit contains its own decoder 121 and coder 126, while demultiplexer 107 and multiplexer 108 remain common to all 24 channel units. It will be apparent to those of ordinary skill in the art that my testing method can be implemented with equal facility on a channel bank arrangement wherein even the coding and decoding circuits are common to all 24 channel units.

In FIG. 1, channel unit control processor 102 is employed for checking framing conditions and for the extraction and insertion of signaling bits into the T1 bit-stream. The channel unit control processor 102 may be a known microcomputer such as the commercially available Intel 8080 microcomputer. The use of such a microcomputer in a channel bank multiplex arrangement is described in my U.S. Patent Application Ser. No. 830,447, filed on Sept. 6, 1977, now U.S. Pat. No. 4,143,246 issued Mar. 6, 1979, and is especially clearly depicted in FIG. 1, 3, and 5 in the drawing thereof. Operational details of channel unit control processor 102 will not be discussed in this application unless necessary to the understanding of my invention.

The operation of the above-described channel bank arrangement 10, of FIG. 1, under usual non-test conditions, proceeds briefly as follows. Illustratively, the first of the 24 eight-bit words constituting a frame of the bitstream on line 1T1, i.e., the PCM word in the first channel, is converted by the channel bank arrangement into signals suitable for transmission on analog line 11. More specifically, PCM signals in the first channel are stored temporarily at receive buffer 101 are demultiplexed at demultiplexer 107 for presentation to receive transmission path 12A of channel unit 151. As they proceed along transmission path 12A, the eight PCM bits of the first channel are converted by decoder 121 to pulse amplitude modulated (PAM) signals in accordance with the coding plan described in the article, "D2 Channel Bank: Multiplexing and Coding," by C. L. Dammann et al, *Bell System Technical Journal*, October 1972, Vol. 51, No. 8, pp. 1682–99. The PAM signals thus produced are smoothed by lowpass filter 122 into a continuous analog waveform and adjusted at gain control circuit 123 so as to meet conventionally prescribed telephone transmission requirements. The resultant analog signal is presented via hybrid circuit 127 to analog line 11. Conversely, analog signals appearing on line 11 are presented via hybrid circuit 127 to transmit transmission path 12A of channel unit 151 wherealong their level is adjusted at gain control circuit 124 and bandlimited at lowpass filter 125. The continuous analog signals thus produced are sampled (sampling circuitry not shown) whereby PAM samples are created. The PAM samples, in turn, are coded into PCM signals at coder 126 in accordance with the coding plan of the Dammann article and reinserted onto the T1 bitstream via multiplexer 108 and transmit buffer 103.

In order that the method steps of my invention may be properly implemented as will be described below, a logic circuit or program, and a plurality of memory cells, all residing in channel unit testing controller 105, are provided for the implementation of a digital loop-around test of channel units in the channel bank arrangement. Channel unit testing controller 105 may be a known microprocessor such as the commercially available Intel 8080 microcomputer. Preferably, testing controller 105 is arranged for the physical sharing of memory, CPU and I/O facilities with the microcomputer resident in channel unit control processor 102. In either case, whether microcomputers are shared or not, after testing controller 105 has received a signal from channel unit control processor 102 that the channel unit selected for testing is idle, a prescribed sequence of test code words, to be described below, is prepared for channel unit loop-around transmission. In turn, each test code word so prepared is loaded via parallel bus 11B into code generator 104 which, illustratively, is a parallel-to-serial shift register. Thereafter, code generator 104 awaits a notification signal via bus 13B from channel unit control processor 102 so that receive buffer 101 may be loaded. The notification signal is produced as described hereinafter.

As noted previously, one of the functions of channel unit control processor 102 during conventional channel bank operation is the maintainance of framing synchronization for the extraction and recovery of signaling information from the T1 bitstream. Moreover as described in my U.S. Patent Application Ser. No. 830,447, filed on Sept. 6, 1977, now U.S. Pat. No. 4,143,246 issued Mar. 6, 1979 at patent column 6, line 16 channel unit control processor 102 also monitors the T1 bitstream and its constituent PCM channels and, as a result of such monitoring, is able to extract and insert test data from the receive and into the transmit buffers, respectively. Accordingly, in the channel bank arrangement of FIG. 1 herein, when channel unit control processor 102 detects the impending receipt of signals in the first PCM channel in the T1 bitstream, it sends a "go-ahead" or notification signal via bus 13B to code generator 104. Upon receipt of the notification signal, code generator 104 loads the prescribed test code PCM signal into receive buffer 101 via bus 14B.

The PCM test code word is thereafter sent over receive transmission path 12A and looped around via hybrid circuit 127 to transmit transmission path 13A of channel unit 151. In traveling this loop-around path, the PCM test code word is converted alternatively into PAM signals, into a continuous analog signal, back to PAM signals, and, finally, into another PCM code word. The PCM code word thus recovered is processed at multiplexer 108 and stored at transmit buffer 103. As was the case during loading of receive buffer 101, channel unit control processor 102 sends a notification signal, via bus 13B, to transmit buffer 103. When so notified, transmit buffer 103 serially loads the looped-around test code stored therein, via bus 15B, into code receiver 106.

Figure 2:
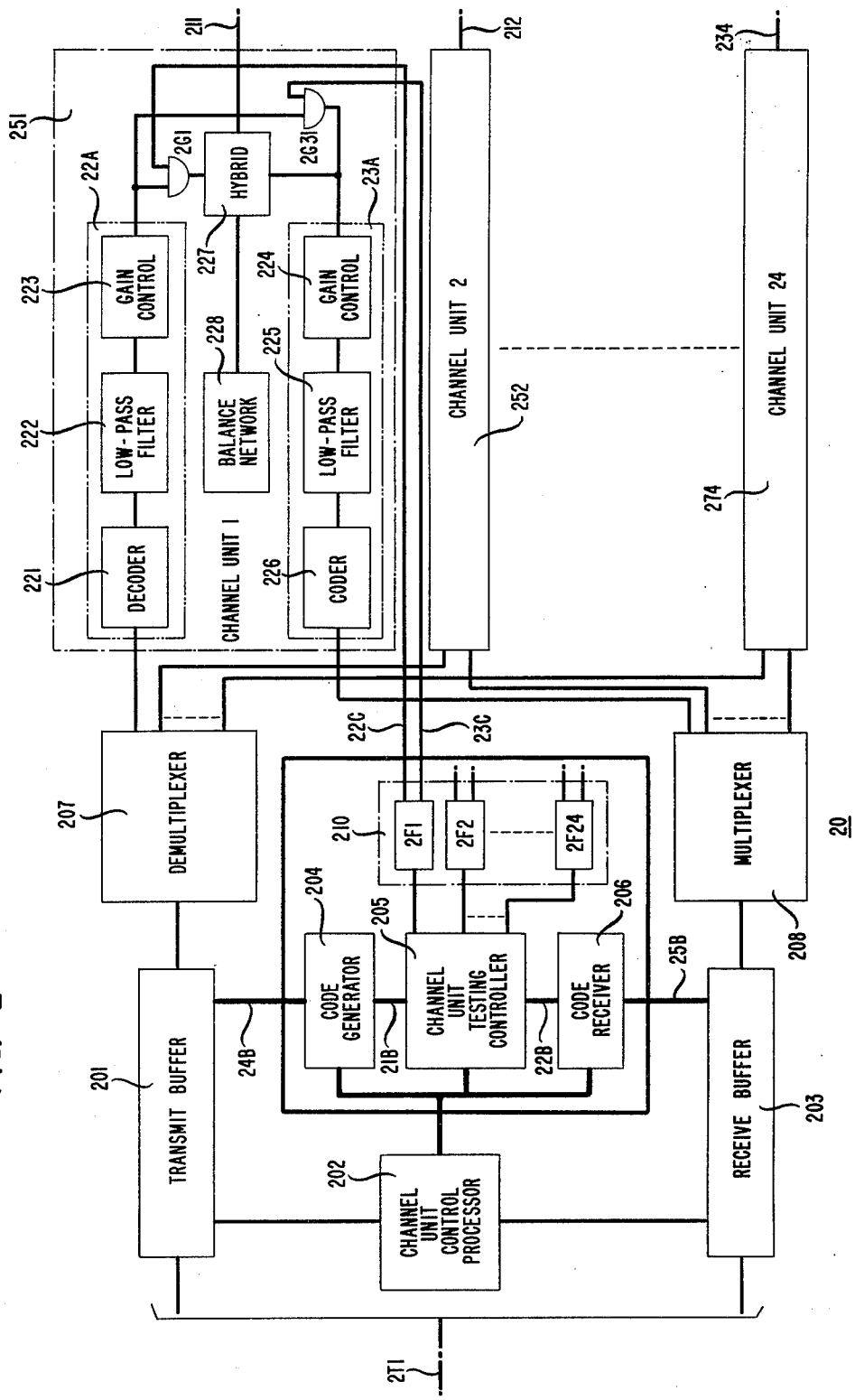
FIG. 2, also in block schematic form, shows channel unit testing apparatus for an alternate embodiment of my invention including a channel unit selector and a gating arrangement in the channel unit.

FIG. 2 depicts an alternate arrangement of the channel back apparatus utilized for the carrying out of my loop-around test method. In FIG. 2, AND gates 2G1 and 2G31 in channel unit 251 have been added to the design of the channel unit of FIG. 1 to provide a dedicated loop-around path, independent of hybrid circuit 227. Additionally, selector 210, connected to testing controller 205 is provided. Selector 210 contains a plurality of bistable memory devices 2F1-2F24 corresponding to each of the 24 channel units in the channel bank arrangement. Illustratively, the bistable devices 2F1-2F24 are wellknown toggle flip-flops.

When channel unit 251 is selected for testing, testing controller 205 provides a toggle signal to flip-flop 2F1. As a result of the toggling, lead 22C goes to a low logic value and lead 23C goes high, thereby disabling the output of AND gate 2G1 and simultaneously enabling the output of AND gate 2G31. These gating actions result in the removal of the hybrid loop-around path and in the activation of the dedicated test loop-around path.

In accordance with my invention, as the PCM test code words are received at code receivers 106 and 206 by means of circuitry previously described in FIG. 1 and 2, respectively, they are evaluated in digital form in accordance with the steps of my method as will be described below. The received PCM code words thus evaluated are useful in determining whether certain prescribed criteria of analog transmission quality had been met while the code words were in continuous analog form on the loop-around path. Analog transmission quality criteria include loss of signal amplitude, background noise on the loop-around path, and freqency-dependent nonlinear distortion. Successful fulfillment of these analog transmission criteria is verified by the implementation of my analytical method steps performed on the looped digital test code words.

Advantageously, according to the method of my invention, code words recovered at code receiver 106 or 206 need not be synchronized or compared with code words generated at code generator 104 or 204. Instead, received test code words only need be evaluated according to their sequential amplitude patterns as will be described forthwith.

As previously pointed out, the number of information bits in a PCM signaling channel in the conventional D2/D3 signaling format is eight bits. In the ensuing description, however, PCM code words having only five bits will be used to demonstrate my method, with the understanding that the test can be carried out on PCM test code words of any bit length.

Figure 3:
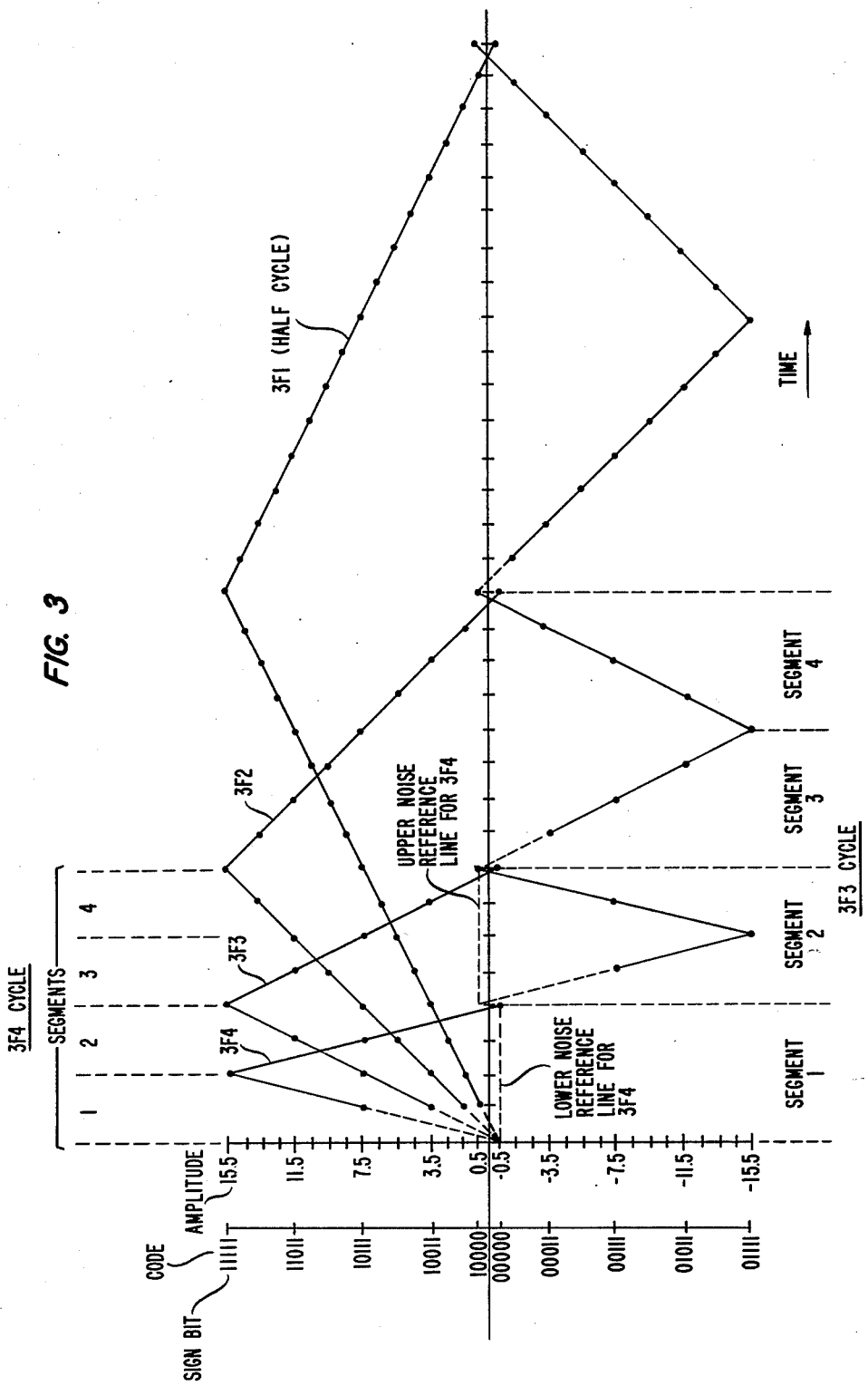
FIG. 3 depicts a plot of the various test code words that are transmitted according to the method of my invention and the representative amplitudes of those words.

FIG. 3 graphically shows a plot of the amplitude values of generated test code words against time. Each five bit test code word comprises four magnitude bits and one sign bit. Thirty-two discrete amplitude levels, ranging from −15.5 to +15.5 are shown on the amplitude axis along with a corresponding PCM code for each such amplitude level.

In my loop-around method, sequences of test code words are generated in PCM form at regularly spaced intervals, according to a prescribed pattern. The pattern is based on interrelationships of the amplitude values of the generated PCM words. Specifically, a sequence of test code words is generated which when plotted on an amplitude scale against time resembles a triangularized cyclical waveform. Inasmuch as the time interval between consecutively generated words is fixed, the frequency of such a waveform cycle may be altered only by changing the amplitude spacing between consecutive test code words.

For example, triangularized waveform cycle 3F4 is a plot of eight uniformly spaced test code word amplitudes. The 3F4 cycle is divided into four labeled segments, each containing two generated test code points. Thus, segment 1 contains test points of amplitudes 7.5 and 15.5; segment 2 contains test points at 7.5 and −0.5; segment 3 in the negative region of the amplitude scale has test code point amplitudes at −7.5 and −15.5; and segment 4 contains test code point amplitudes at −7.5 and +0.5. It is to be noted that the lines joining the code points in segments 2 and 3 are not contiguous. This situation arises because the time axis of the graph in FIG. 3 (wherealong amplitude is 0) does not in itself represent a code word. Rather, the time axis occurs at amplitude level 0 which corresponds to a point precisely between code words 00000 and 10000. The zero amplitude level could not be assigned to a code word because it would not be possible to cyclically traverse the 32 code levels between −15.5 and +15.5 in equally spaced amplitude steps by starting from the zero amplitude level. Therefore, an imaginary line at amplitude level −0.5, depicted as a dotted line in FIG. 3 and designated as the lower noise reference line, is used as a reference or zero line for the generation of code points in segments 1 and 2 of the 3F4 waveform cycle. Similarly, an upper reference noise line, depicted as a dotted line in segments 3 and 4 of the 3F4 cycle at amplitude level +0.5, represents the reference or zero line for code points generated throughout the negative portion of the amplitude scale in segments 3 and 4.

The existence of the upper and lower reference lines allows for uniform amplitude spacing between consecutive test code points. For example, the second test code point in segment 2 of waveform 3F4 and the next generated point in segment 3 have amplitude values of −0.5 and −7.5, respectively. In the absence of the aforementioned two reference lines, the resultant spacing of 7.0 amplitude units would appear to differ from the uniform spacing of 8.0 units employed in generating the other test code points in waveform 3F4. However, if the spacing of the first point in segment 3 is taken with respect to the upper reference line, the 8.0 unit uniform spacing is maintained. It is noted however that no test code point is actually generated at the upper noise reference line. Conversely, the amplitude spacing of the first point in segment 1 is taken with respect to the lower reference line. In FIG. 3, dotted lines are shown extending from the first generated code points in segments 1 and 3 to their respective reference lines.

Waveform 3F3 has a shape similar to that of 3F4 except that it requires 16 points rather than eight for the traversal of a cycle. Similarly, waveform 3F2 requires 32 points for a complete cyclical traversal, while waveform 3F1 requires 64 such points (but only half of the cycle 3F1 is shown). Therefore, the cyclical frequency of waveform 3F2 is twice that of 3F1; of 3F3 is twice that of 3F2, and of 3F4 is twice that of 3F3.

In my digital loop-around method, code words are generated in accordance with the foregoing description such that, if consecutively plotted on an amplitude scale, triangularized waveforms of the type shown in FIG. 3 would result. In the preferred embodiment of my invention, a plurality of test code word sequences, plottable as sequences of consecutive triangularized waveform cycles on the amplitude scale are generated. The generation of waveform cycles at each frequency is repeated a prescribed number of times, M. Illustratively, M cycles of test code words are generated which if amplitude-plotted would yield M consecutive triangularized waveform cycles of the 3F1 type at a frequency of 64 test code points per cycle. In addition, a plurality of code word sequences plottable into waveform cycles at other frequencies, are generated. Preferably the test code word sequences are generated in order of ascending frequency. For example, the first 64M points to be generated have values plottable into M triangularized waveform cycles of the 3F1 type. Similarly, the next 32M test code points generated are plottable into M cycles of 3F2 waveform; the next 16M test code words traverse M cycles of the 3F3 waveform; and the last 8M test code points yield M cycles of the 3F4 waveform.

The cyclical plots depicted in FIG. 3 are for test code words of five bits. Similar cycles may be derived for any number of bits per test code word. Thus, if a test code word contains $N+1$ bits of which N are magnitude bits and one bit is a polarity indicator, then triangularized waveform cycles having N different frequencies are possible. The lowest frequency cycles are traversed by generating a waveform in steps of one, i.e., by generating a code word at each amplitude level in the amplitude scale. Thus, at the lowest frequency, the stepsize, or interval separation between test points is one, the number of points per segment of the cycle being generated is $2^N$ and the number of points per cycle being generated is $2^{(N+2)}$. Table I shows the step sizes, points per segment and points per cycle relationship to cyclical frequency in terms of the N magnitude bits for a test code word.

TABLE I

| FREQ. (F) | STEP SIZE | POINTS PER SEGMENT | POINTS PER CYCLE |
|---|---|---|---|
| 1 | 1 | $2^N$ | $2^{(N+2)}$ |
| 2 | 2 | $2^{(N-1)}$ | $2^{(N+1)}$ |
| 3 | 4 | $2^{(N-2)}$ | $2^N$ |
| . | . | . | . |
| . | . | . | . |
| . | . | . | . |
| N − 2 | $2^{(N-3)}$ | $2^3$ | $2^5$ |
| N − 1 | $2^{(N-2)}$ | $2^2$ | $2^4$ |
| N | $2^{(N-1)}$ | $2^1$ | $2^3$ |

Equations 1–3 analytically illustrate the relationship of the named quantities with cyclical frequency, F.

$$\text{STEP SIZE} = 2^{(F-1)} \quad \text{EQUATION (1)}$$

$$\text{POINTS PER SEGMENT} = 2^{(N-F+1)} \quad \text{EQUATION (2)}$$

$$\text{POINTS PER CYCLE} = 2^{(N-F+3)} \quad \text{EQUATION (3)}$$

Preferably, for any value of N, each cyclical frequency is generated M times in order of ascending frequency.

Figure 4:
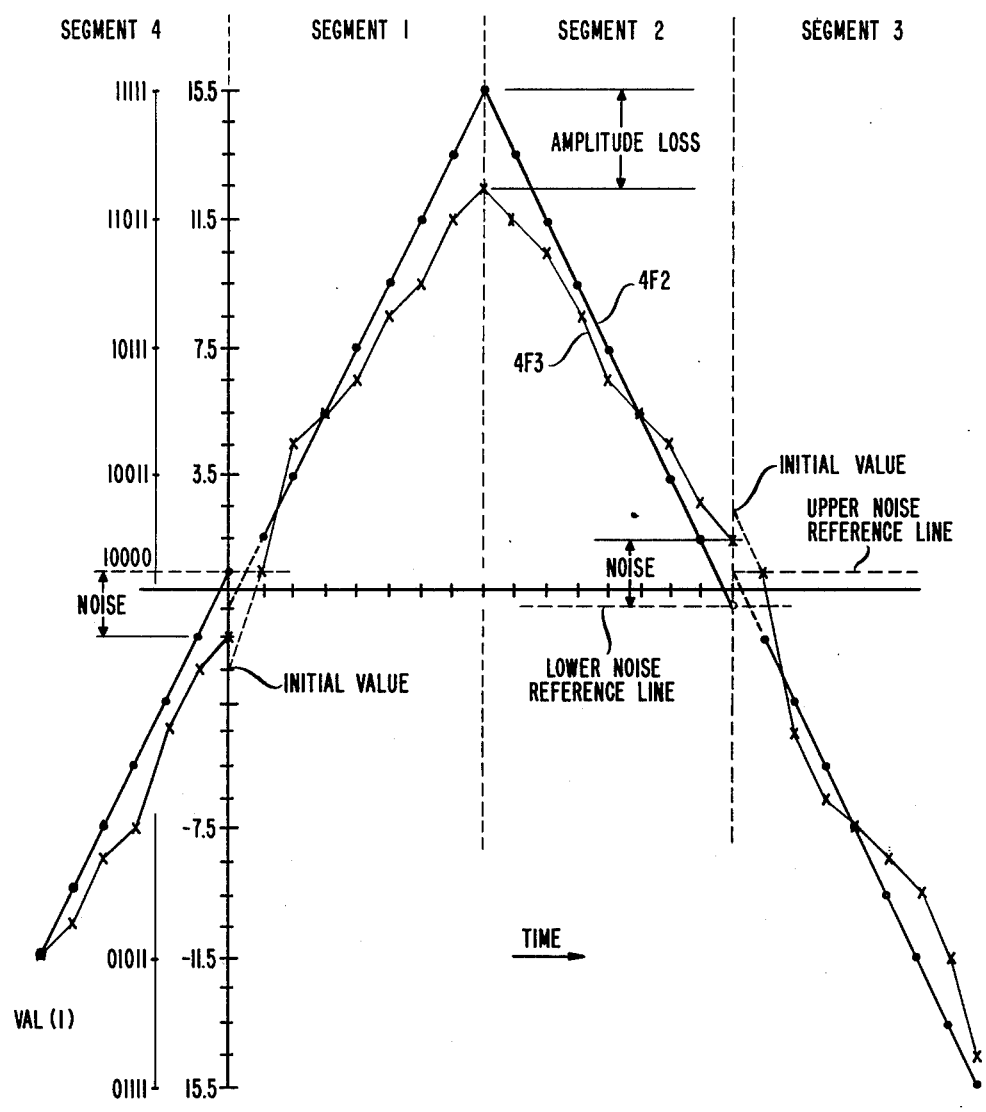
FIG. 4 depicts a detailed waveform plot of a sequence of generated test code words, and its received digital representation.

FIG. 4 shows a more detailed plot of triangular waveform 3F2 in FIG. 3. Waveform 4F2 in FIG. 4 represents the generated sequence of test code points plotted against time wherein segment 4 of a previous 4F2 waveform cycle is shown to the left of the origin, and segments 1 through 3 of the next 3F2 cycle are shown to the right of the origin. Waveform 4F3 is a plot, also against time, of an illustrative set of received test code points. Although waveforms 4F2 and 4F3 do not occur simultaneously because of loop-around delay, they are depicted as so occurring in FIG. 4 for purposes of comparison. At the peak of the triangle in segment 1, the amplitude level difference between the eighth test code point of the generated test code in waveform 4F2 and its received counterpart in waveform 4F3, is a qualitative indicator of amplitude loss of the test code word while that word was in decoded analog form on the loop-around path. The test code point amplitude level difference is measured near the peak, because at the peak, its existence is almost entirely attributable to analog amplitude loss rather than background noise on the loop-around path. The underlying reason for this stronger correlation between PCM amplitude level difference and analog amplitude loss near the peak is related to the way in which the coding and decoding of PCM signals is conventionally done, as will be forthwith described.

For the purposes of this disclosure, it is assumed that the coding plan employed is the one described in the article, "D2 Channel Bank: Multiplexing and Coding," by C. L. Dammann et al, Bell System Technical Journal, October 1972, Vol. 51, No. 8, pp. 1682–85, and in "A Companded Coder for an Experimental PCM Terminal," Bell System Technical Journal, by H. Mann et al, Vol. 51, No. 1, January 1962, pp. 173–87. As described in the Mann et al article, in conventional PAM-to-PCM coding, input PAM signals are nonlinearly "tapered" whereby high amplitude PAM signals are compressed and low amplitude signals are emphasized prior to coding. Emphasis of low amplitude signals is achieved by spreading these signals over a greater number of code word levels than would be the case if they were linearly encoded. This approach, known as companded coding, requires compression of the PAM signals prior to their encoding into PCM signals and the expansion of decoded PCM signals. In my preferred illustrative embodiment, as shown in FIG. 1, it is assumed that decoder 121 is of the type described in the Dammann et al article, pp. 1695–96, in that both the decoding and expansion functions are performed thereby. Similarly, it is further assumed that coder 126 is of the type described in the Dammann et al article, pp. 1685–95 whereby both the coding and compression of the PAM signals are achieved. As a result of companding, the effect of additive background noise in the loop-around path is exaggerated at low test code word amplitude levels due to code expansion and understated at high amplitude levels. Accordingly, the reason for the difference in amplitude levels between generated and recovered PCM test code words having high amplitude magnitudes, such as those occurring near the positive and negative peaks of a triangular waveform cycle, is, for the greater part, unrelated to the underemphasized background noise amplitude in the analog loop-around path. Conversely, a PCM amplitude level difference near the zero amplitude level has a substantial noise component which, due to expansion, has been exaggerated.

Thus, referring to FIG. 4, the eighth test code words of segment 1 and 3, representative of the positive and negative triangular waveform peaks respectively, provide a qualitative measure of amplitude loss.

Similarly, the eighth test code point in segments 2 and 4 of the received waveform 4F3, when measured against their respective noise reference lines as defined earlier, produce measures of additive background noise on the analog loop-around path.

An indicator for the third transmission criterion, frequency-dependent nonlinear distortion, is derived from an evaluation of the shape of the received triangular waveform cycles themselves. Specifically, the slopes of the lines joining received test code points in a given segment of a cycle are compared against an average slope for the segment under evaluation. The variance between the slope of each line joining the consecutive test code points and the average slope is found by well-known least squares analysis and summed over the total number of such lines in the segment. Illustratively, in FIG. 5, segment 1 of waveform 5F3 (identical to waveform 4F3) comprises eight test code points joined by piecewise connecting lines therebetween. Additionally, the first point in segment 1 of waveform 5F3, at amplitude level +0.5, is shown joined, by a dotted line, to a point on the amplitude axis labeled "initial value." This initial value is an imaginary point which is neither generated nor received (except once as described below), but which is equivalent to the last, or eighth, test code point received in the previous segment (segment 4), reduced by one amplitude level. The amplitude level is so reduced because of the previously described non-contiguity, by one amplitude level, between the waveforms traversed in segments 4 and 1. It is this same discontinuity which gives rise to the existence of upper and lower noise reference lines of FIG. 4 with respect to which noise is measured. Line 5RGR1 in FIG. 5 connects the eighth (or peak) test code point in segment 1 with the initial value of that segment and has a slope equal to the average of all the slopes of the piecewise lines, connecting the received test code points in segment 1.

In my illustrative embodiment, method steps to be described are carried out for the determination of the total of the least squares variances between the piecewise slopes of each of the lines interconnecting test code points and the average slope. The total variance so determined is a measure of the degree of bending of the portion of waveform 5F3 that traverses segment 1. The bending of this waveform portion is a qualitative indicator of frequency-dependent distortion occurring while test code signals are on the loop-around path. Illustratively, certain conventional types of frequency-dependent distortion of the analog waveform such as frequency dependent amplitude distortion, frequency dependent phase distortion and nonlinear harmonic distortion give rise to a "bending" of the waveform plot as compared to that of a straight line slope. Accordingly, determination of the variance of the portion of waveform 5F3 in segment 1 is employed as a qualitative indicator of the existence of these three types of frequency dependent distortion.

An alternative embodiment of my method involves the implementation of method steps whereby the variances of the slopes of the lines connecting the test code points of segment 1 are derived with respect to a line having a different average slope than that of 5RGR1, namely, that of 5RGR2. Line 5RGR2 is fitted to the eight received test code points in segment 1 by means of well-known least square regression techniques rather than by means of an averaging of all slopes comprising the waveform 5F3 in segment 1. The variance measure with respect to line 5RGR2, as with line 5RGR1, is indicative of frequently-occurring types of frequency-dependent distortion of the analog signal in the loop-around path.

Figure 6:
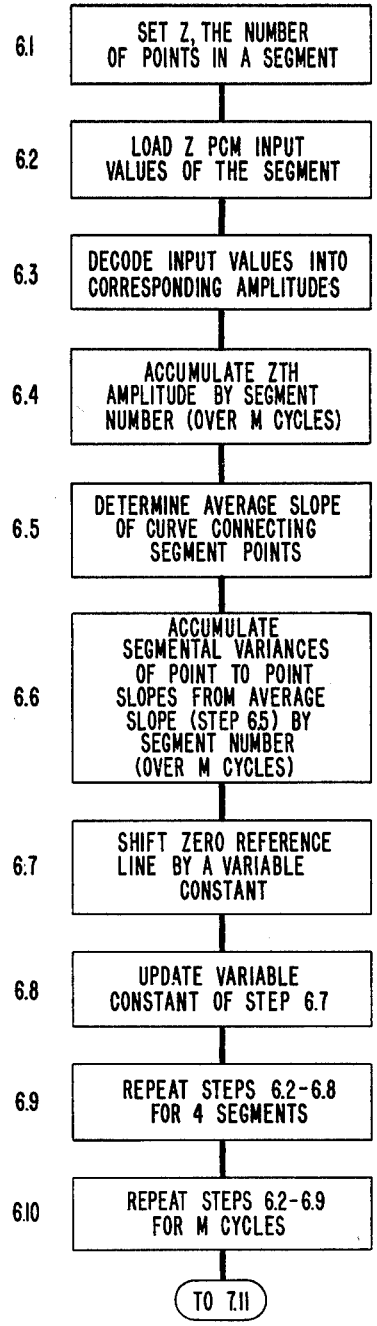
Figure 7:
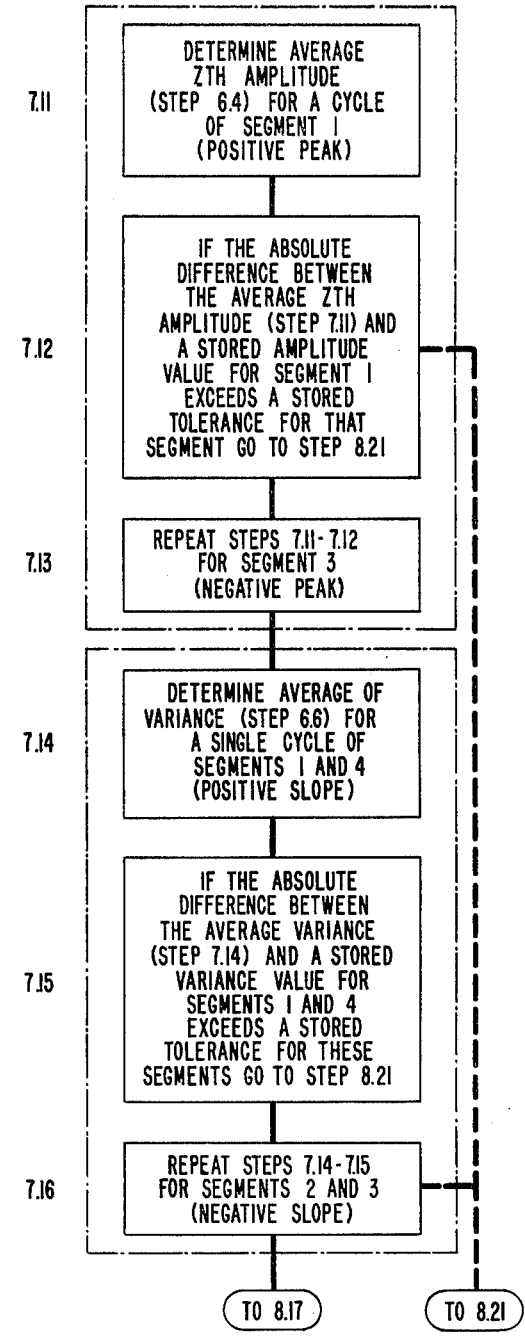

The three above-described analog transmission criteria, i.e., amplitude loss, frequency dependent distortion and loop-around transmission path noise are ascertainable qualitatively by the implementation of method steps for the receipt and evaluation of recovered PCM test code words as will be described hereinafter. It is assumed that test code words are generated in accordance with my previous description, whereby M waveform cycles are generated at each cyclical frequency in order of ascending frequency. In FIGS. 6–8 a general flow diagram for test code word receipt and evaluation is shown. Thereafter, more detailed flow diagrams concerning test code word generation as well as their receipt and evaluation will be described.

Referring to the general flow diagram spanning FIGS. 6–8, step 6.1 involves setting the value of a variable, Z, which represents the number of points traversed in a segment of a cycle for a given frequency F. As previously shown in Equation 2, Z is equivalent to $2^{(N-F+1)}$ where N is the number of magnitude bits in a test code word. Step number 6.2 requires the loading of the PCM test code words received at code receiver 106 after passage along the loop-around path. Preferably, channel unit testing controller 105 recognizes the first set of looped PCM words by evaluating PCM words at code receive 106, locating by means of well-known algorithms the first positive maximum value in the PCM code word cycle and counting PCM code words to the beginning of the next loop cycle. In the next cycle, the first Z PCM values are decoded in step 6.3 into their corresponding amplitude level values by a coding logic circuit or program resident in testing controller 105 (but not shown in FIG. 1). In step 6.4, the amplitude value of the last or $Z^{th}$ test code word of each segment in accumulated over the prescribed number of waveform cycles, M, and a separate cumulative value is stored for each of the four segments at the current given triangular waveform cyclical frequency, F. It is noted with reference to step 6.4 and FIG. 4 that after step 6.4 will have been repeated for M cycles, the accumulated $Z^{th}$ value for segments 1 and 3 will represent a summation of the positive and negative peaks, respectively, of the triangular waveform cycle. Similarly, accumulated $Z^{th}$ values of segments 2 and 4 each represent summations of the two zero amplitude crossings in the triangular waveform.

For purposes of determining the qualitative degree of frequency dependent distortion, step 6.5 is implemented whereby the average slope of the curve connecting the received test code points in the segment under evaluation is determined. Illustratively, this average slope may be determined in accordance with the method previously described for attaining an average slope for a segment with respect to line 5RGR1. This may be done by subtracting from the $Z^{th}$ value in the segment the imaginary initial value previously defined in FIG. 5 which is one amplitude level less than the amplitude of the $Z^{th}$ value of the previous segment. The resultant difference is then divided by the number of test code points in the segment to arrive at the average slope. A more detailed method for obtaining the average slope referred to in step 6.5 will be described later.

Shortly thereafter, in step 6.6, the variances of the slopes of the lines joining the test code points which traverse the segment under consideration are determined with respect to the average slope defined in step 6.5. This variance is determined by employing conventional least squares techniques and by thereafter summing the slope variances over the entire segment. This sum of variances for the segment is in turn accumulated by segment number over M cycles of the triangular waveform at the given cyclical frequency.

Step 6.7 involves an understanding of the previously described initial value (see FIGS. 4 and 5) which corresponds to a value one amplitude level distant from the last or $Z^{th}$ test code point of the immediately previous segment. This initial value is required for subsequent passes through the flow diagram for a determination of the average slope (step 6.5) and for a determination of the variance of the slope of the line connecting the first point in the segment with the imaginary initial value (step 6.6). Step 6.7, in requiring a shift of the stored value of the noise reference line, reflects the need for the adjustment of the disparity between the actually received $Z^{th}$ value in the previous segment and the imaginary initial value. The variable constant is selected such that it subtracts a single unit of amplitude level after a segment 4 waveform has been traversed, adds a single level of amplitude after a segment 2 waveform has been traversed and makes no changes whatsoever after segments 1 or 3 have been traversed because traversal of the latter two segments culminates in a peak rather than a zero crossing and requires no adjustment. The shifting in step 6.7 is therefore implemented, in preparation for the next traversal or pass through of steps 6.5–6.6.

The variable constant referred to in step 6.7 which updates the value of the reference line is, in step 6.8, itself updated in preparation for the carrying out of step 6.7 for the next pass through the flow chart. Thereafter, in step 6.9, steps 6.2 through 6.8 are repeated for each of the four segments in the triangular waveform cycle. Moreover, steps 6.2–6.9 are, in step 6.10, repeated for each of M triangular waveform cycles at the given waveform cyclical frequency. Consequently, the carrying out of steps 6.9 and 6.10 results in 4 M passes through steps 6.2–6.8. In sum, upon the completion of 4 M passes through step 6.4, a value will have been reached for each segment number which represents the summation over M cycles of the $Z^{th}$ amplitude of that segment. Similarly, with reference to step 6.6, after 4 M passes, a value is reached for each segment number which represents the cumulative slope variance over M waveform cycles. In sum, steps 6.1–6.10 represent the receiving or information-gathering portion of my method. Attention will now be focused on the evaluative portion of method.

FIG. 7 and 8 depict groups of steps in flow diagram form including step groups 7.11–7.13, 7.14–7.16 and 8.17–8.20, depicted as step groupings by means of dotted lines. These step groups, when implemented, yield qualitative indications of amplitude loss, frequency-dependent distortion, and signal noise around the loop-around path, respectively. The successful completion of each of these groups of method steps is a prerequisite for the implementation of the immediately succeeding group of such steps.

In step 7.11, the average positive peak of the triangular waveform cycle at the current cyclical frequency is determined by dividing the cumulative $Z^{th}$ amplitude value for segment 1, accumulated in step 6.4 after M passes therethrough, by M.

The derived average $Z^{th}$ amplitude thus determined in step 7.11 is, in step 7.12, compared to a value that has been prestored in the memory of testing controller 105 in a manner described hereinafter. This prestored value represents the acceptable or benchmark value of the average $Z^{th}$ amplitude for segment 1 of a waveform cycle having the currently evaluated cyclical frequency. The absolute deviation between the derived and prestored average $Z^{th}$ amplitude is then compared to a prestored tolerance value which was developed for segment 1 of a waveform cycle having the currently evaluated cyclical frequency. If the absolute deviation exceeds the prestored tolerance, step 8.21 is implemented, and in accordance therewith the channel unit is designated as defective.

The above-mentioned prestored average $Z^{th}$ amplitude and prestored tolerance, are formulated and derived prior to or contemporaneously with the installation of the channel bank arrangement 10, of FIG. 1. The values are derived by manual techniques and are stored in dedicated memory cells of channel unit testing controller 105. Illustratively, in FIG. 1 a telephone plant service person deploys conventional analog test circuitry at line 11 and listens to remotely generated prescribed speech signals, which, when converted to PCM words, are received at line 1T1, converted back to analog form via the channel bank circuitry and presented to analog line 11. By maneuvering gain control circuit 123, a service person can make an optimal adjustment thereof so that speech signals produced at analog line 11 sound as undistorted as possible in comparison with the original remotely-generated speech signals. This technique can be reversed, i.e., the service person may transmit prescribed speech signals at analog line 11. These signals are converted into PCM words and sent via line 1T1 to the aforementioned remote location where, when reconverted to analog form, they can be compared with the originally generated signals. Optimal adjustment of gain control circuit 124 is then possible.

When adjustment of control circuits 123 and 124 is complete, channel unit 151 is put in the testing mode by the service person whereby the PCM test code words plottable into a triangular waveform having the cyclical frequency of interest are looped around channel unit 151 and examined at code receiver 106. Generation of the PCM test code word sequence at the given cyclical frequency may be repeated many times so that accurate average received values may be derived and prestored. Thus, by maneuvering gain control circuits 123 and 124, an acceptable, representative benchmark for the average $Z^{th}$ amplitude for segment 1 at any given frequency may be derived.

In a similar manner, the tolerance of deviation from the average $Z^{th}$ amplitude may be derived by slightly distorting the remotely generated speech signals that are presented at PCM line 1T1, listening to the resultant, reconstituted analog signal at line 11, and noting the average change in amplitude of the $Z^{th}$ test code point at code receiver 106. The maximum tolerance may be manually derived by intensifying the degree of distortion of the remotely generated speech signal to the point where the audible signal degradation at analog line 11 is no longer acoustically tolerable. The manually determined average $Z^{th}$ amplitude and tolerance thus derived are stored in the memory portion of channel unit testing controller 105. As will be described in more detail later, other averaged quantities relative to the received test code words are also prestored by the manual method just described, for comparison in my method steps to average values derived from looped test code word sequences.

Returning to step 7.12, if the absolute deviation between the derived and prestored average $Z^{th}$ amplitude exceeds the prestored tolerance, then step 8.21 is implemented whereby an indication is made at channel unit test controller 105 that the channel unit 151 is defective and the test is concluded. If, however, the tolerance is not exceeded in step 7.12, step 7.13 is implemented whereby steps 7.11–7.12 are repeated for a determination of the average $Z^{th}$ amplitude for segment 3 in order to ascertain the average negative peak. For negative peak derivations, values are prestored representing both the average $Z^{th}$ amplitude and the tolerance for segment 3 of a waveform cycle having the current cyclical frequency. These prestored values are manually determined by the service person as previously described. If both the average positive and negative peaks are within their corresponding tolerances, the amplitude loss test for the current frequency, has been passed and the group of steps 7.14–7.16 are next implemented for a qualitative determination of frequency dependent distortion.

In step 7.14, the cumulative sums of variances determined in step 6.6 after M cycles for segment 1 is added to the corresponding cumulative sums for segment 4. As was previously seen upon examination of FIG. 4 the generated test code points of each segment are connected by a piecewise straight line "curve" labelled 4F2. Although the two lines connecting the generated test code points in segments 1 and 4 respectively are not contiguous, they are parallel to each other and their slopes are equal. Accordingly, since their slopes are identical throughout both segments during test code point generation, they are suitable for averaging over both segments during test code point recovery. Therefore, in step 7.14, the variance sums are obtained for the entire positive sloping portion of the triangular waveform cycle by averaging the cumulative sums of variances of segments 1 and 4, each previously determined in step 6.6, over 2 M cycles. In step 7.15, the absolute difference of the variance summation averaged over segments 1 and 4, as derived in step 7.14, and a prestored average variance summation value is compared against a prestored tolerance value. The prestored values are determined by employing a service person as described in connection with step 7.12. An exceeded tolerance results in implementation of step 8.21, indication of channel unit malfunction and termination of the loop-around testing method. Otheriwse, step 7.16 is carried out whereby steps 7.14 and 7.15 are repeated for a determination of the variance sums of the negative sloping portion of the waveform cycle averaged over segments 2 and 3.

Figure 5:
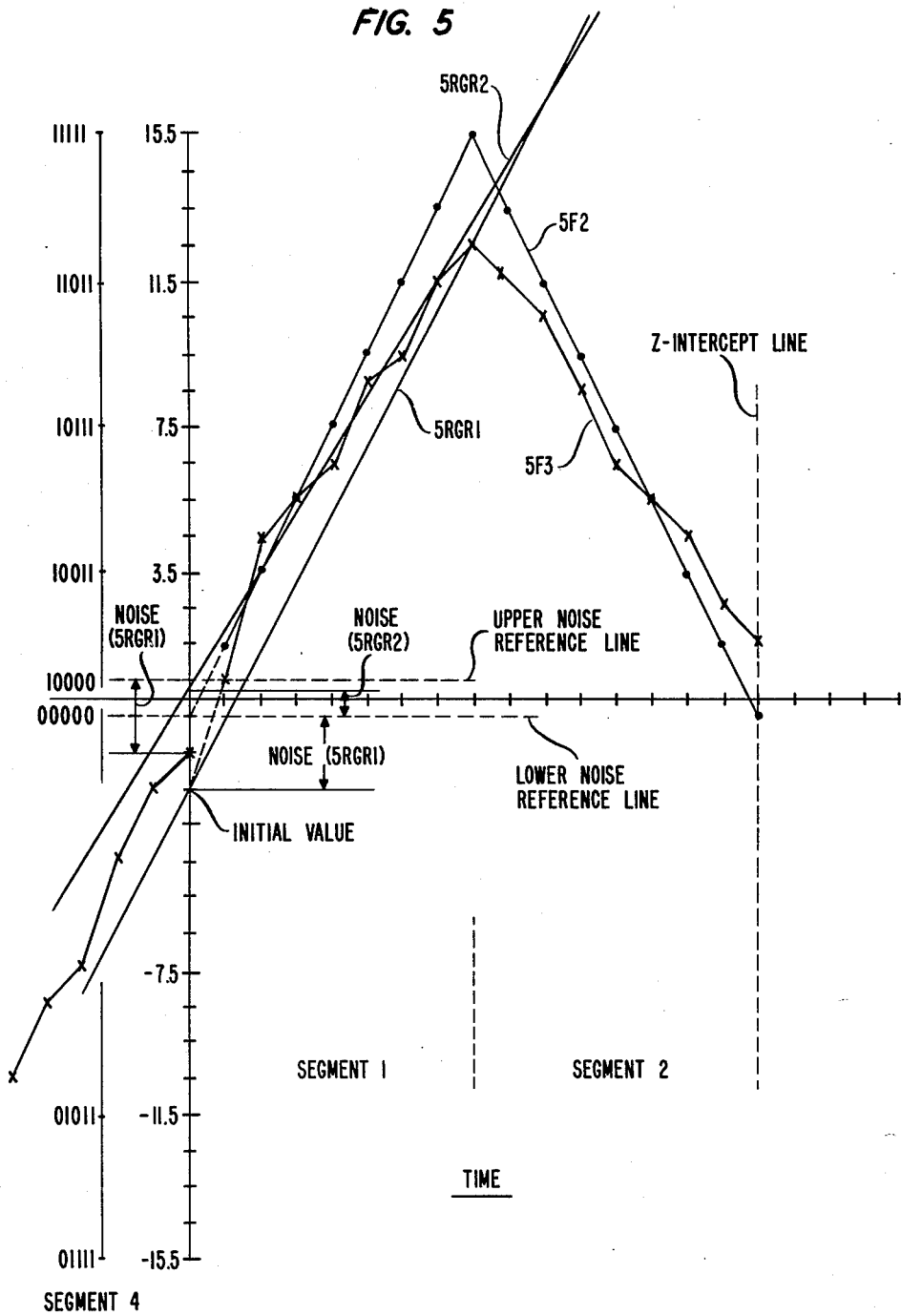
FIG. 5 depicts a plot of generated and received digital test code words and lines representing the average slope of the lines interconnecting the received digital test codes.

As previously noted, slope variances are not determined by comparing slopes of the piecewise line connecting the received test code points to those of the generated test code points, but rather, by comparing the piecewise line slopes to the average slope line designated 5RGR1 (or 5RGR2) in FIG. 5. Specifically, the sum of slope variances measures the degree of bending of a curve connecting the test code words traversing a segment with respect to a straight line. This degree of bending is then compared to a tolerable degree of bending that would result in the presence acceptable frequency dependent distortion on the analog loop-around path. Therefore, if step groups 7.14–7.16 have been successfully completed, a qualitative indication has been made that the sum of slope variances of the piecewise lines joining the received test code points are within tolerance.

Thereafter, method steps 8.17–8.20 are carried out for a qualitative determination of noise. As earlier described, an examination of FIG. 5 shows that noise is derivable by noting the amplitude of the $Z^{th}$ test code point in segment 4 and comparing that amplitude to the amplitude at which an average slope line, e.g., 5RGR1 or 5RGR2, intersects the zero time axis. Illustratively, it will be noted in FIG. 5 that the average noise with respect to line 5RGR1, may be viewed either as the difference between the point labelled initial value and the lower noise reference line in segment 1 or as the difference between the $Z^{th}$ value of segment 4 and the upper noise reference line. Accordingly, in step 8.17, as in step 7.11, the cumulative $Z^{th}$ amplitude for segment 4, as determined in step 6.4, is averaged over M cycles. Thereafter, in step 8.18, from the average $Z^{th}$ amplitude determined in step 8.17 is subtracted the corresponding noise reference line in segment 4 to obtain the adjusted noise value. This step is necessary so that the noise value with respect to the proper noise reference line is obtained. A similar technique for adjusting noise values with respect to line 5RGR2 (regression bit) will be described later. In step 8.19, as in steps 7.12 and 7.15 previously, prestored values are employed. These values are derived by the service person as described earlier. The absolute deviation between the average adjusted noise value derived in step 8.18 and the prestored noise value is compared with the prestored tolerance for segment 4. If the tolerance is exceeded, step 8.21 is implemented, and the channel unit is indicated as being defective. Otherwise, steps 8.17–8.19 are, in step 8.20, repeated for segment 2 so that noise near the other zero amplitude level crossing of the waveform cycle may be determined.

The foregoing steps 6.1–8.20 (and 8.21) are implemented at a given cyclical frequency. Upon successful completion of testing at that frequency, tests are subsequently carried out at higher frequencies to insure signal quality at all frequencies. Accordingly, step 8.22 requires the repetition of steps 6.1–8.21 at each of the N frequencies. It will be noted that, in step 6.1, Z, the number of points in a segment, depends on the frequency number N in the manner previously shown in Table I, and Equation 2. Successful repetition of steps 6.1–8.21 at each frequency provides a qualitative indication that the channel unit is functioning properly.

The foregoing description of the flow diagram embraced in FIGS. 6–8 is a general description of the method steps required for the recovery and evaluation of test code words in my loop-around test method. A more detailed explanation of my method follows wherein the detailed steps required, both for the generation of my PCM test code points and for their reception and analysis is shown. Moreover, more detailed flow diagrams will be indicated.

Specifically, FIG. 9 shows memory resident in channel unit testing controller 105 relating to the test code generation portion of my method. The memory comprises a group of counters for indicating the frequency number, cycle number, half-segment number, segment number and points (within a segment) number. It also contains a accumulator register, ACC, for storing amplitudes of PCM test code words to be generated.

Figure 10:
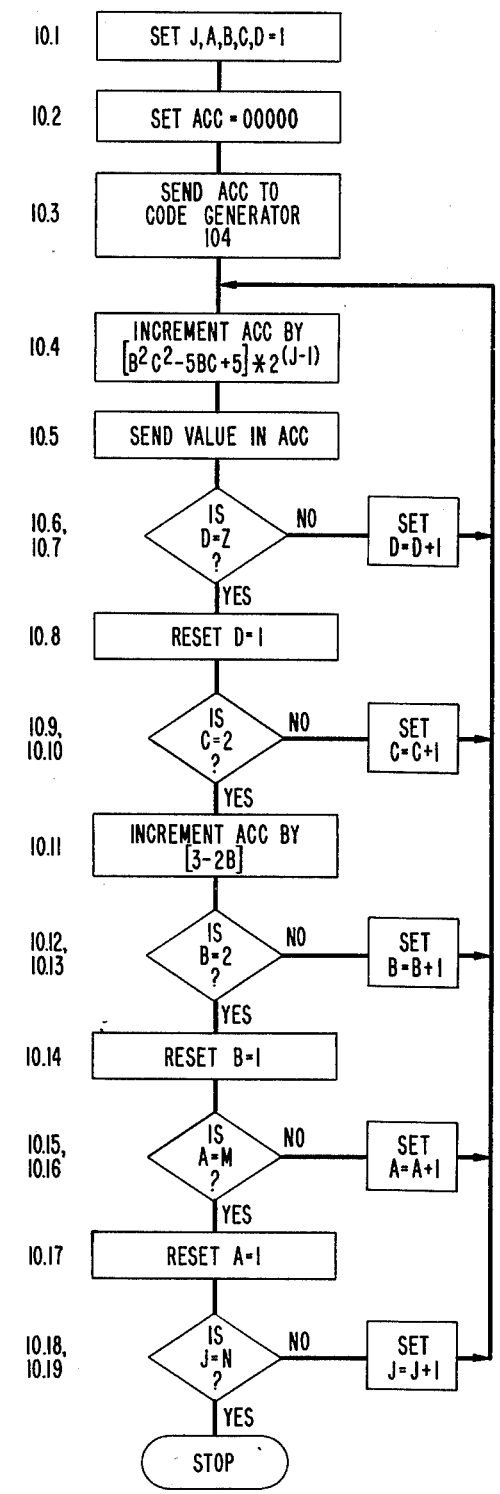
FIG. 10 is a detailed flow diagram of the method of generating test code words.

FIG. 10 shows a flow diagram for implementing the generation of the PCM test code words. In step 10.1, the five counter memory cells are initialized to a value of one. Thereafter, in step 10.2, the accumulator register ACC is set to 00000 corresponding to amplitude value −0.5, which, as seen in FIG. 5 corresponds to the amplitude of the initial value of waveform 5F2. Then, in step 10.3, the code word stored in register ACC is prepared for sending in PCM form at code generator 104 where it will be looped-around the channel unit to be tested in the manner earlier described.

To gain an understanding of step 10.4, it is necessary to refer to FIG. 3, and in particular to waveform 3F1. After 00000, the −0.5 code value (lower noise reference line) has been generated in step 10.3, preparation is made for the generation of the 16 points in segment 1 of 3F1. As described earlier, the amplitude spacing between the generated test code points for a given triangular waveform cycle is dependent upon the frequency thereof in accordance with Equation 2. Accordingly, since the frequency counter value, J, for waveform 3F1 is one, the amplitude spacing value, $2^{(J-1)}$ is also one. Therefore, in step 10.4, register ACC is incremented by the expression $[B^2C^2-5BC+5]*2^{(J-1)}$ which contains the step-size factor, $2^{(J-1)}$ of Equation 2 and a sign factor, $(B^2C^2-5BC+5)$, indicative of whether a segment being traversed is positively sloping as in segments 1 and 4, or negatively sloping as in segments 2 and 3. The sign term is equal to $+1$ in segments 1 and 4 and $-1$ in segments 2 and 3. Accordingly, as step 10.4 is iteratively reimplemented, the sign term affords continuous traversal of a triangular waveform cycle. Thereafter, in steps 10.5, the resultant encoded word in register ACC in channel unit testing controller 105 is prepared for sending at code generator 104.

In step 10.6, the points counter, D, is examined for a determination of the number of points traversed in the segment. If the points in the segments have not all been traversed, then counter D is incremented by one in step 10.7 and the generation of the points in the current segment proceeds at step 10.4. If, in step 10.6, counter D has a value Z, i.e., the segment has been completely traversed, then the D counter is, in step 10.8, reset in preparation for a later passthrough.

In step 10.9, counter C, indicative of which of the two quarter-segments in the current half-segment is being traversed, is examined. If counter C is equal to 1, then either segment 1 or 3 has been completely traversed. If that is the case, then in step 10.10, counter C is incremented and step 10.4 is reimplemented for the next segment. If C is equal to 2, i.e., either segment 2 or 4 has been traversed, then an adjustment in accordance with step 10.11 is necessary. This adjustment relates to the previously described upper and lower noise reference lines depicted in FIG. 4. As previously noted, a discontinuity with respect to waveform 4F2 arises at the boundaries between segments 2 and 3 and between segments 4 and 1 as shown in FIG. 4. This discontinuity necessitates an adjustment of the register ACC wherein the amplitudes of test code points to be generated near the discontinuities are adjusted. Accordingly, if in step 10.9, it is determined that the traversal of either segments 2 or 4 has been completed, then in step 10.11, register ACC is incremented by (3-2B). If the value of B, the half-segment register is one, then the segment just traversed is segment 2, and ACC is incremented by one so that the first point in segment 3 may be generated in reference to the upper noise reference line. Similarly, if B is equal to 2, then traversal of segment 4 has just been completed and ACC is incremented by −1 so that the points to be generated in segment 1 are referenced with respect to the lower noise reference line.

Thence, in step 10.12, if counter B, indicative of the half-segment number, is 1, then it is incremented by one in step 10.13 and step 10.4 is reimplemented for the next segment. If B is equal to 2, then the entire waveform cycle has been traversed and, in step 10.14, B is reset to 1 in preparation for a later passthrough. If the latter is true, then counter A, a cycle counter which keeps track of the number of cycles already traversed for a given waveform cyclical frequency, is examined. The value of counter A is compared with M, the prescribed total number of cycles. Thus, in step 10.15, if the value of counter A is less than M, then additional waveform cycles at the current waveform cyclical frequency need to be generated. Accordingly, in step 10.16, counter A is incremented by one and step 10.4 is reimplemented for the next segment of the next waveform cycle. If the value of counter A is equal to M, then all cycles for the current cyclical waveform frequency have been traversed and, in step 10.17, counter A is reset to one in preparation for later passthroughs.

After generation of all M cycles, counter J, a frequency counter, is examined in step 10.18. If counter J has a value less than N, the maximum frequency, then J, in step 10.19, is incremented and step 10.4 is reimplemented. Otherwise, if J is equal to N, then each cyclical frequency has been generated M times and the generation of test code points is complete.

The foregoing flow diagram in FIG. 10 and the related memory in FIG. 9 are employed in my method for the generation of test code words around the loop-around path in the channel unit.

Figure 11:
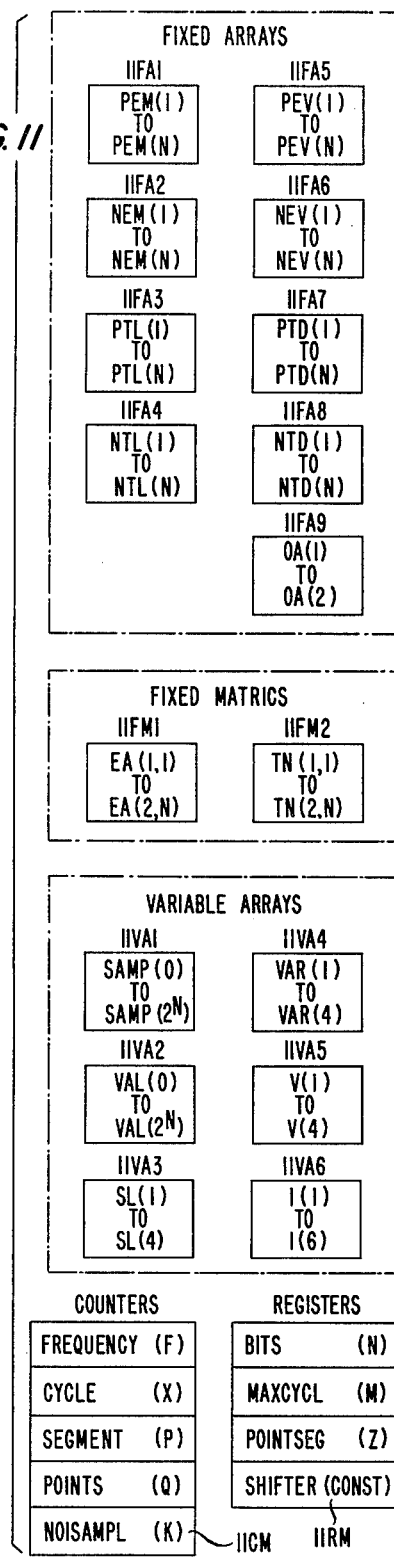
FIG. 11 shows the memory allotted in my controller for the receipt and processing of the generated test code words.
Figure 12:
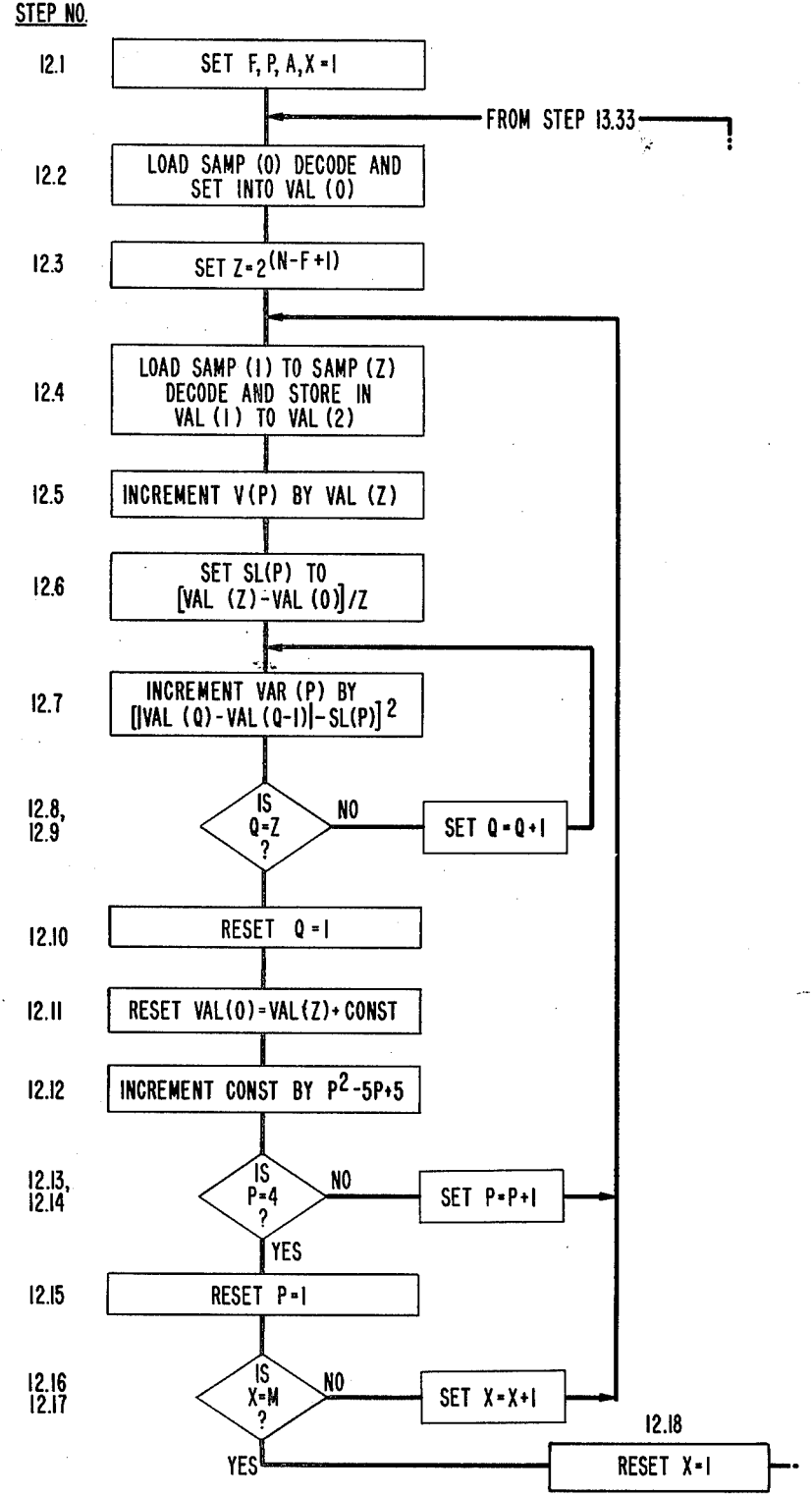
FIG. 12 and 13 depict a more detailed and particularized flow diagram than that of FIG. 6–8 of my method for evaluating the received test code data.
Figure 13:
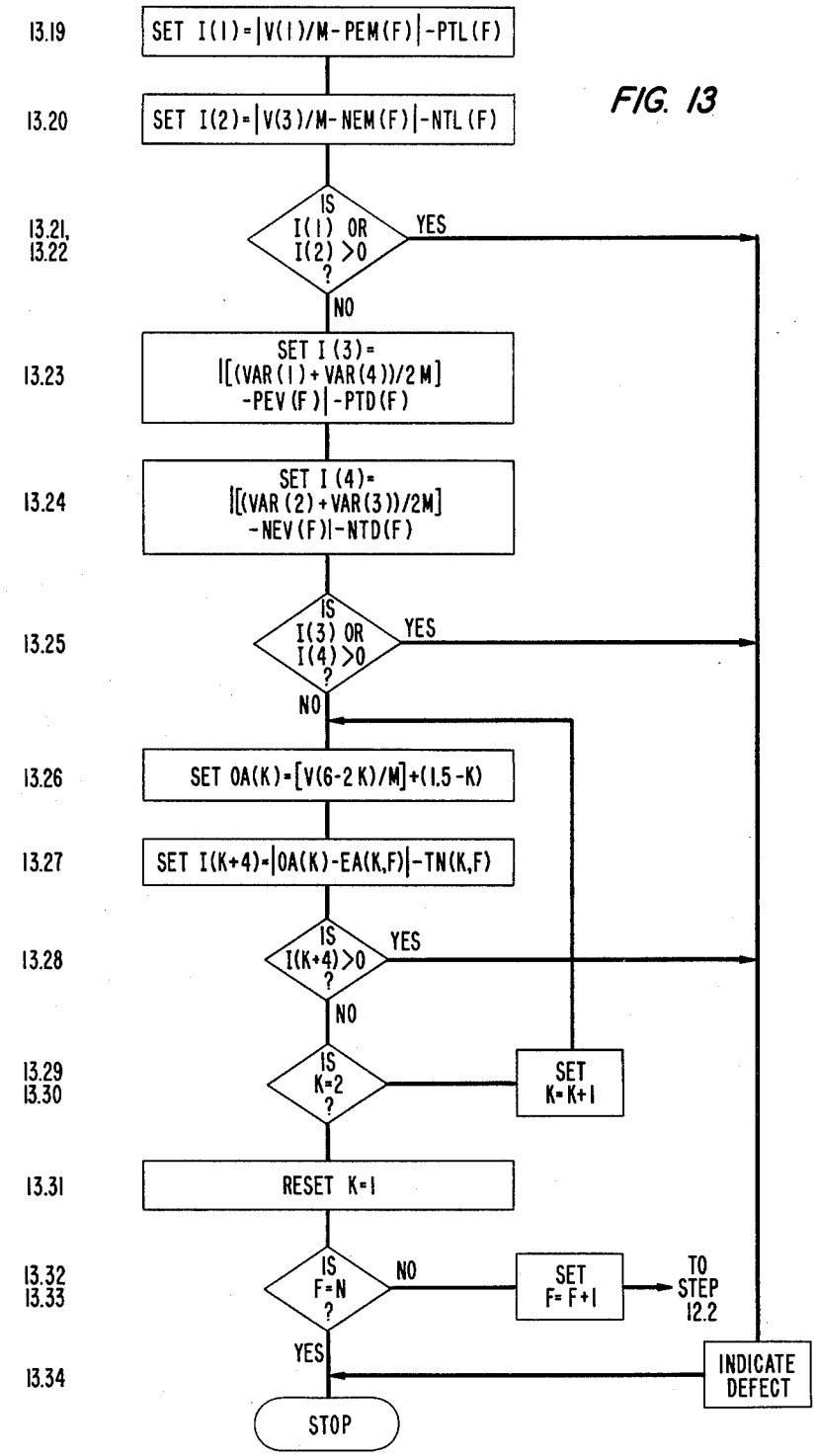

The memory allocations shown in FIG. 11 and the method steps shown in the detailed flow diagram in FIGS. 12–13 relate to the implementation of my method steps with respect to the recovery and evaluation of the looped test code points at code receiver 106. In FIG. 11, fixed arrays 11FA1–11FA9, fixed matrices 11FM1–11FM2, variable arrays 11VA1–11VA6, counter memories 11CM and register memories 11RM, are allocated for my method in channel unit testing controller 105. The fixed arrays, fixed matrices and variable arrays shown in FIG. 11 will be described in detail as they are affected by the method steps to be described in the flow diagram in FIGS. 12 and 13, hereinafter.

In counter memory 11CM, counters are allocated for keeping track of cyclical frequency (F), cycle number (X), segment number (P), number of points traversed per segment (Q) and noise amplitude sample points (K), i.e., the number of points in a cyclical waveform at which noise amplitude is sampled. In register memory 11RM, registers are allocated for the number of magnitude bits in a code word (N), the maximum number of cycles generated at a given frequency (M), the number of points in a segment (Z) and the value of a variable constant (CONST) for adjusting received test code point values at zero amplitude crossing discontinuities. All memory cells except the counter and register memory cells are assumed initialized to zero.

Turning to the detailed flow diagram in FIG. 12–13, in step 12.1, counters F, P, Q, X, and K are initialized to a value of one. In order to gain an understanding of step 12.2, steps 10.2 and 10.3 of the test code generation flow diagram (FIG. 10) need be reexamined with particular reference to FIGS. 1 and 5. After steps 10.2 and 10.3 have been implemented, the initial test code point, 00000, corresponding to an amplitude level of −0.5, is looped around and received at code receiver 106. It is this initial value sample that in step 12.2 is stored in a sample storing array 11VA1 of the variable arrays in the memory portion of channel unit testing controller 105. Array 11VA1 contains $2^N+1$ memory cells, designated SAMP(0) to SAMP($2^N$), for storing the initial value sample and up to $2^N$ received test code value samples in a segment. The initial value sample derived in steps 10.2–10.3 is looped around only once, i.e., prior to the evaluation of the first test code point in the first segment of the first cycle of the first waveform that was generated. Thus, step 10.3 is implemented and sample 00000 is generated only once for each channel unit test. The initial value sample corresponds to the initial value discussed in relation to FIG. 5. It serves as the reference point for the first generated test code point in segment 1 so that the piecewise slope of the line joining it with the first test code point in the first segment may be determined for use in averaging and variance processing. However, in subsequent cycles, the initial value is not needed because slope averaging and variance processing can be done by referencing the first point in segment 1 with one amplitude level less than the last test code point value in segment 4 of the previous cycle. Accordingly, in step 12.2, a received, looped-around initial test code word, 00000, is stored in SAMP(0), decoded into its corresponding amplitude representation and set into memory cell VAL(0) of variable array 11VA2, which array is similar in organization to that of array 11VA1.

Thereafter, in step 12.3, the number of points in a segment to be evaluated is set into the Z register in accordance with Equation 2, above. It is noted that the number of points per segment is $2^{(N-F+1)}$ and is therefore dependent on the current cyclical frequency value in register F and the number of magnitude bits in the test code word, stored in register N. Once Z has been determined for a given cyclical frequency, only the first Z+1 memory cells in arrays 11VA1 and 11VA2 are needed.

As test code words are looped around the channel unit and received at code receiver 106, they are, in step 12.4, loaded into memory cells SAMP(1) to SAMP(Z), decoded and then stored in positions VAL(1) through VAL(Z) of array 11VA2. Thus, all test code points belonging to a particular segment are buffered in the variable array memory of channel unit testing controller 105.

Implementation of step 12.5 then occurs, whereby, the $Z^{th}$ amplitude value stored in VAL(Z) is added to the first position in array 11VA5, i.e., V(1). The memory cells V(1)–V(4) are employed to accumulate the $Z^{th}$ amplitude value of each segment. Step 12.5 of my detailed flow diagram corresponds to step 6.4 of my generalized flow diagram previously described.

Thereafter, step 12.6 (which corresponds to step 6.5 in the generalized flow diagram) is implemented and the average slope of the curve connecting the received test code points in the segment is determined. As previously discussed with respect to line 5RGR1 in FIG. 5, the average slope of the points traversing a segment is the slope of a line connecting the $Z^{th}$ amplitude value in a segment with its initial value as shown in FIG. 5. As earlier indicated, except for the very first received test code point, the initial value is one less than the $Z^{th}$ value of the fourth segment of the previously received triangular waveform cycle. Accordingly, a slope in step 12.6 is determined by subtracting the initial value stored in VAL(0) from the $Z^{th}$ value stored in VAL(Z), then dividing by the number of test code points Z. The result is set into array 11VA3, the array employed for the storage of average slopes in cells SL(1)–SL(4) according to segment number. Illustratively, in the first pass-through via step 12.6 the average slope over segment is stored in cell SL(1).

Steps 12.7–12.10, when implemented, correspond to the implementation of step 6.6 in the general flow diagram in FIG. 6 whereby the variances of the slopes in a given segment are determined with respect to the average slope of that segment and summed. In step 12.7 this is done by employing a well known least-squares expression whereby the slope of a given line is compared to the average slope and the difference therebetween is squared. Accordingly, in step 12.7, the slope of a line connecting two adjacent test code points is formed by differencing the amplitudes of two consecutively received test code points stored in adjacent memory cells, VAL(Q-1) and VAL(Q), of array 11VA2. From that difference, the slope value which had been determined in step 12.6 and stored in cell SL(P) of array 11VA3, is subtracted. The result is squared and stored in variance array 11VA4 in the cell of the current segment, VAR(P).

Thereafter, in step 12.8, counter Q, having stored therein the points traversed per segment, is updated. If Q is less than Z, then step 12.9 is implemented, whereby Q is incremented and step 12.7 is repeated. As a result, steps 12.7–12.9 are traversed Z times. When Q is equal to Z, step 12.10 is implemented and the point per segment number, Q, is reset to one for future passthroughs of the flow diagram. Each time steps 12.7–12.10 are reimplemented in later passthroughs of the flow diagram during subsequent cycles, VAR(P) is incremented by the sum of all variances in the segment. Accordingly, the segment variance sums are accumulated in VAR(P) by segment number, P. After passage through the flow diagram for M cycles, VAR(P) will contain the cumulation over all segmental variance sums of all M cycles, sorted by segment number. Thus, steps 12.7–12.10 correspond to step 6.6 in the general flow diagram in FIG. 6.

Upon completion of a determination of variances sum for a given segment, an adjustment must be made to the reference line as previously described in connection with FIG. 4 and step 6.7 of the general flow diagram. As then described, the noise reference line must be shifted downward when passing from segment 4 of one cycle to segment 1 of the next and upward when passing from segment 2 to segment 3 of the same cycle (see FIG. 4). For the same reasons, the initial values in segments 1 and 3 are shifted downward and upward, respectively, with respect to the $Z^{th}$ value of their predecessor segments. The establishment of these artificial initial values is necessary so that the first test code point generated in a segment may be differenced therewith so as to enable slope variance determination. Accordingly, the points designated as initial value in FIG. 4, are placed in VAL(0) as either segment 1 or 3 is evaluated. Thus, in step 12.11, as in step 6.7 of the general flow diagram, the memory cell of array 11VA2 containing this initial value, i.e., VAL(0), is updated by adding the constant CONST which, initially, is set to zero.

Subsequent values of CONST are determined in accordance with Table II and are updated in step 12.12.

TABLE II

| P | CONST | $P^2 - 5P + 5$ |
|---|---|---|
| 1 | 0 | 1 |
| 2 | 1 | −1 |
| 3 | 0 | −1 |
| 4 | −1 | 1 |
| 1 | 0 | 1 |
| 2 | 1 | −1 |

Thus, initially CONST is 0 and the reference point is not shifted because no such shift is required between segments 1 and 2 of a triangular waveform. Thereafter, while the segment counter, P, still has a value of 1, step 12.12 is implemented whereby the expression $P^2-5P+5$ is added to the current value of CONST register. The result of this addition yields a value of 1, which, when added to CONST provides a shift of 1 for the next passthrough via step 12.11 when P will be two. Accordingly, when segment 2 is operated upon by the reimplementation of steps 12.4, etc., the value of VAL(0) is incremented by the value of CONST, i.e., 1, because of the necessity of the positive shift upward when passing between segments 2 and 3. While segment 2 is still being traversed, the expression of step 12.12 is determined as being −1 and added to the current value of CONST, i.e., 1, thus yielding a CONST value of 0 for use in the next traversal of step 12.11 for segment 3. As can be seen in Table II, the value of CONST (and the expression in step 12.12) cyclically repeats itself as the boundary between segments 4 and 1 is crossed. Accordingly, steps 12.11 and 12.12 correspond respectively to steps 6.7 and 6.8 of the general flow diagram.

Thereafter, in steps 12.13–12.15, the segment counter P is tested and, if necessary, updated so that steps 12.4–12.12 are repeated for the next segment of the current cycle. If the cycle is complete, then counter P is reset to 1 for subsequent passthroughs and steps 12.16–12.18 are implemented. In the latter group of steps, the number of cycles currently traversed is examined. Accordingly, M passthroughs via steps 12.4–12.15 are implemented with the cycle counter, X, being updated in step 12.17. After M passthroughs, step 12.18 is implemented for a resetting of cyclical counter X. The foregoing step groups, i.e., 12.13–12.15 and 12.16–12.18, correspond respectively to steps 6.9 and 6.10 of the generalized flow diagram.

Upon completion of the implementation of steps 12.4–12.18 for all M cycles, steps 12.19–13.35 are carried out for a determination of whether tolerances with respect to amplitude loss, slope variance and noise values have been exceeded. It is to be noted, that, after execution of the steps of the flow diagram in FIG. 12, each cell in variable array 11VA4 contains, for each segment, the cumulative segment variance sums over M cycles. Similarly, for each segment, array 11VA5 contains a summation of the $Z^{th}$ value of all M cycles that have been received. Arrays 11VA4 and 11VA5 will be used in the flow diagram portion in FIG. 13 to test the analog transmission criteria previously enumerated.

However, it is first necessary to point out other arrays relevant to the implementation of steps 13.19–13.35. Variable array 11VA6 contains six memory cells I(1) to I(6) for storing the six indicator values, i.e., values which, when greater than 0, give rise to an indication that the channel unit under test is defective as will be described below. The fixed arrays 11FA1–11FA9 and the fixed matrices 11FM1–11FM2 are employed for determining the indicator values I(1) to I(6). Each of the fixed arrays 11FA1–11FA8 contains N cells corresponding to N frequencies, where the value of N is stored in bit register N. As will be seen upon examination of Table I, above, N different frequencies are traversed in the test code word generation flow diagram of FIG. 10 and in the received test code word processing flow diagram of FIGS. 12–13. Accordingly, values are prestored in each of the fixed arrays at the cell number in the array that corresponds to a particular frequency. For example, in array 11FA1, cell PEM(1) contains a prestored value corresponding to positive expected maximum, PEM, at a frequency of 1. Similarly, in fixed array 11FA7, cell PTD(N) contains a prestored value corresponding to the positive tolerated distortion at the $N^{th}$ cyclical frequency of the triangular waveform. The uses of these fixed arrays and fixed matrices will become apparent as steps 13.19 and those following it are described.

Steps 13.19–13.22 in my detailed flow diagram correspond to steps 7.11–7.13 in my general flow diagram in FIG. 7. In step 13.19, the average $Z^{th}$ amplitude for the first segment taken over M cycles at the current frequency, F, is determined. This is done by taking the cumulative $Z^{th}$ amplitude for the first segment, which had been determined in step 12.5 and stored in memory cell V(1) of array 11VA5, and dividing it by M. In the first segment this average $Z^{th}$ amplitude (see FIG. 4), corresponds to the positive peak of the triangular waveform cycle. As described in step 7.12 of the general flow diagram, from this observed or determined average $Z^{th}$ amplitude is subtracted a prestored expected average $Z^{th}$ amplitude value derived by a service person, which value corresponds to the current triangular waveform frequency, F. Since this expected value relates to the positive peak it is known as the positive expected maximum and is prestored in cell PEM(F) of array 11VA5.

The prestored PEM value is established by a service person prior to or during installation of the channel unit into service, in a manner previously described with regard to step 7.12. As then noted, the service person makes manual adjustments of gain control circuits 12.3 and 12.4 of the channel unit for optimal performance and prestores the average $Z^{th}$ amplitude value after making these adjustments. In a similar manner, a service person determines an acceptable amplitude tolerance with respect to that average $Z^{th}$ amplitude and prestores this positive tolerated loss in PTL(F). Thus, in step 13.19, the prestored tolerated loss is subtracted from the absolute difference between the observed or determined average $Z^{th}$ amplitude for the first segment and its prestored expected counterpart, i.e., the actual loss is compared with the prestored tolerated loss. The result is set into variable array 11VA6 at cell I(1). In similar manner, I(2) is derived in step 13.20 by first determining the absolute difference between the average $Z^{th}$ amplitude in segment 3, i.e., the value stored in cell V(3), divided by M cycles, and the negative expected maximum for the current frequency, F, stored in NEM(F). From this actual tolerance loss with respect to the negative peak of the triangular waveforms cycle (in segment 3) is subtracted the negative tolerance loss for the current frequency, F, prestored in array 11FA4 in cell position NTL(F).

If either I(1) of I(2) is greater than 0, as is determined in step 13.21, then the prestored amplitude tolerance of the channel bank has been exceeded, and step 13.34 is implemented. In the latter step, an indication is made that the channel unit under test is defective and that corrective action is necessary. If I(1) or I(2) are both less than zero then step 13.23 is begun.

Steps 13.23–13.25 correspond to steps 7.14–7.16 in the general flow diagram. As discussed therein, and in reference to FIG. 4, the slopes of the lines connecting consecutively received test code points are positive in segments 1 and 4 and negative in segments 2 and 3. Thus, the variance with respect to positive-sloping segments are averaged in step 13.23 while the variances relevant to the negative sloping lines, connecting points in segments 2 and 3, are averaged in step 13.24.

Specifically, variance sums for a given segment are accumulated in cells VAR(1) through VAR(4) of array 11VA4, in accordance with the step 12.7 over M cycles. Therefore, in step 13.23, the expression [(VAR(1)-+VAR(4))/2M] is utilized so that the average variance sum for a segment may be taken over both segments 1 and 4. From this average variance sum is subtracted the value prestored in array 11FA5 cells for the current frequency, F. Array 11FA5 contains the positive expected variance for each frequency, i.e., PEV(F). From this absolute difference is subtracted the positive tolerated distortion for the current frequency, stored in cell PTD(F) of array 11FA7. The resultant value is stored in indicator cell I(3). Similarly, for negative sloping segments 2 and 3, the indicator value I(4) is determined in step 13.24 by averaging the variances stored in cells VAR(2) and VAR(3) over 2M cycles, absolutely differencing the average variance with the prestored negative expected variance stored in NEV(F) of array 11FA6, and comparing this absolute difference with a negative tolerated distortion value, NTD(F) in array 11FA8.

If either I(3) or I(4) is greater than 0, then step 13.34 is carried out and a defective channel unit is indicated. It is noted that, in both steps 13.21 and 13.25, any indicator value, i.e., any value of I(1)–I(4) which exceeds 0, triggers an indication that the channel unit is defective and termination of the testing steps. Of course, this may occur at any frequency, F. If, however, none of I(1)–I(4) are greater than 0, then the succeeding steps, 13.26–13.31, are carried out for implementing noise tests. These noise determination steps correspond to steps 8.17–8.20 of the generalized flow diagram.

In step 13.26, the observed amplitude array, OA(K), of 11FA9, is utilized for storing the averaged $Z^{th}$ amplitude of segment, shifted by a corresponding noise reference line value. The shift is made so that an average observed amplitude occurring near the time axis is derived with respect to its corresponding noise reference line. Illustratively, the $Z^{th}$ amplitude value of waveform 4F3 in segment 4 of FIG. 4 at its intersection with the amplitude axis is −1.5 and the total noise with respect to the upper noise reference line at +0.5 is −2.0. Alternatively, at the end of segment 2 in FIG. 4, the $Z^{th}$ value in segment 2 of waveform 4F3 is +1.5 and the lower noise reference line is −0.5, resulting in a total noise amplitude of +2.0.

FIG. 5 depicts how the noise is calculated with respect to the average slope line of a given segment, 5RGR1. As noted previously, the average slope is obtained by averaging the piecewise slopes of the lines connecting the looped test code word values. Line 5RGR1 is a line having this average slope and is derived by connecting the $Z^{th}$ amplitude value with the initial value in a particular segment. Accordingly, in FIG. 5, the −2.0 noise amplitude shown in the segment 4 portion of waveform 5F3 is also derivable in segment 1 of FIG. 5 by noting that the $Z^{th}$ value in segment 1 is −2.5 taken with respect to the lower noise level reference line −0.5. Accordingly, it makes no difference whether the noise levels are measured in segment 4 with respect to the upper noise reference line, or in segment 1 with respect to the lower noise reference line.

For purposes of the description of step 13.26, it is assumed that noise measurements are made by evaluating the average $Z^{th}$ value in segments 4 and 2, because these $Z^{th}$ values occur near the time axis. As noted earlier, due to companding techniques employed in coder 126 and decoder 121 of the channel unit, the change in amplitude between generated and received values near the time axis is most attributable to noise on the loop-around path. Accordingly, fixed array 11FA9 contains observed amplitude values at two cell positions, OA(K), where counter K in memory 11CM, has two values and serves as an index for determining the number of zero crossing measurements being taken. The observed amplitude for the first zero crossing is comprised of the cumulative $Z^{th}$ amplitude value over M cycles stored in step 12.5 in variable array 11VA5 at cell V(4), divided by M. Thus, the first portion of the expression in step 13.26, i.e., V(6–2K), is equivalent to V(4) because K was initialized to 1 in step 12.1. On the subsequent pass, when counter K is incremented to 2 (in step 13.30), V(6–2K) is equivalent to V(2) and represents the zero amplitude crossing that occurs between the boundaries of segments 2 and 3 in FIG. 4. In either case, whether K equals 1 or 2, the corresponding noise reference line is taken into account by the second portion of the expression in step 13.16, namely, (1.5–K) which is equal to 0.5 when K is 1 near the 4 zero amplitude crossing in segment 4 and is equal to −0.5 when K equals 2 near the zero amplitude crossing in segment 2. Accordingly, for each zero crossing, the appropriate downward or upward shift is made so that the amplitude measurement is taken with respect to its corresponding noise reference line as previously discussed with respect to step 8.18 of the general flow diagram.

The last two memory cells in variable array 11VA6, i.e., I(5) and I(6), are determined in step 13.27. In that step, the absolute difference is taken between the observed amplitude, as determined in step 13.26, and the corresponding expected amplitude prestored in fixed matrix 11FN1 at position EA(K,F). In matrix EA(K,F), K is the noise amplitude index value in counter memory 11CM and F is the current frequency number. Illustratively, if K is 1 and the frequency is 5, then the matrix position at EA(1, 5) is utilized. The absolute difference thus determined is the actual noise from which is subtracted a tolerance noise, prestored in cell TN(1, N) of fixed matrix 11FM2. The EA and TN array values are determined and prestored prior to or during installation by service persons as previously described.

In step 13.28, if the index value I(K+4), i.e., I(5) or I(6) is greater than zero, then step 13.34 is implemented and a defective channel unit indication is made. Otherwise, steps 13.29-13.31 are implemented whereby, if the noise amplitude counter K is not at value two, then K is incremented and steps 13.26-13.28 are repeated. If K is equal to 2, then noise amplitude signal testing at the zero amplitude crossing in segments 4 and 2 has been completed and K is reset to 1 at step 13.31.

When all tests have been completed for the particular triangular waveform cyclical frequency, F, and no defective channel unit indication has been given, then step 13.32 is carried out and the current value of the cyclical frequency, F, examined. If F is not at the maximum frequency, N, then the F counter is incremented at step 13.33 and steps 12.2-13.33 are implemented for the next waveform cyclical frequency. If, however, the F counter has a value of N, then the test is complete for all frequencies and the channel unit is not defective. Accordingly, the test sequence terminates.

In an alternative embodiment of the method, line 5RGR2 in FIG. 5 rather than line 5RGR1, is employed as the average slope with respect to which the slope and variance processing is carried out. In contrast to my just-described embodiment, line 5RGR2 is not derived by averaging all the slopes of the piecewise lines interconnecting the test code points in a given segment as is the case with line 5RGR1, but is derived by employing least squares regression techniques to fit a line to the test code points in a segment.

The derivation of an average slope line by utilizing regression techniques rather than by slope averaging all the slopes of the lines interconnecting test code points in a given segment, requires various changes, both in the memory allocated in channel unit testing controller 105 for the receipt of the test codes and for their processing; and in the flow diagram for the implementation of such processing. However, no alteration is necessary, neither with respect to my method steps for the generation of the test code points nor with the allocated memory associated therewith (FIGS. 9 and 10).

With respect to the memory allocated to the receipt of the test code points and their processing, FIG. 14 shows the portion of the memory shown in FIG. 11 that must be modified to accommodate and reflect the changed method of deriving an average slope line. Accordingly, register memory 14RM comprises the same memory cells as were included in register memory 11RM, with the addition of four regression constant registers, RG1-RG4. These additional register memories are employed to store regression constants for determination of the average slope line. Variable arrays 14VA1-14VA5 are identical to arrays 11VA1-11VA5 in FIG. 11. To those variable arrays is added variable array 14VA6 containing eight memory cells for the indicator, I, rather than the six cells employed in array 11VA6 of the previously-described embodiment. In addition, variable arrays 14VA7-14VA9 are added for the storage therein, by segment number, of intercept values, accumulated intercept values and accumulated slope values as will be described hereinafter.

Since regression lines are fitted to test code points received in each segment, four such lines are derived for a triangular waveform cycle of a given frequency, along with four corresponding noise values. Derivation of these four noise values rather than the two derived in the first embodiment earlier-described, arises from the fact that, in the first embodiment, the average noise value determined in segment 1 was identical to the noise value determined in segment 4, which is not the case in the currently-described embodiment. Specifically, line 5RGR1 passes through the initial value point (in FIG. 5) which, in turn, is exactly one amplitude level lower than the $Z^{th}$ value of segment 4 of the previous cycle. Accordingly, in the first embodiment, a derivation of an average slope using averaging of the slopes of the lines interconnecting the test code points in a given segment yields identical noise values whether taken from segment 4 or segment 1. As previously noted, the latter observation is not true in the alternative embodiment wherein the average slope, 5RGR2, is derived by regression techniques and is independent of the $Z^{th}$ value of the fourth segment of the previous waveform cycle.

Accordingly, four values of noise are possible and more memory allocation is required. Therefore, fixed matrices 14FM1 and 14FM2 are added in place of fixed matrices 11FM1 and 11FM2 whereby both arrays EA and arrays EN each range from (1,1) to (4,N). In addition, amplitude counter K, ranges from 1 to 4, rather than from 1 to 2 as was the case in the previously described embodiment. For the same reason, fixed array 14FA9 is added so that the observed amplitude array OA contains four memory cells rather than the two in fixed array 11FA9.

Changes are also necessitated in my flow diagram of FIGS. 12-13 which outlined my detailed method steps for the receipt and processing of looped test code words. Thus, steps 15.10-15.20 in the alternate embodiment are inserted in place of step 12.6 in the first-described embodiment. In the substitute steps, regression techniques are employed to derive a line similar to line 5RGR2 which represents a least squares fit of the test code points in a given segment. Thus, after step 12.5 has been completed, step 15.10 is implemented, whereby regression constant register RG1 is incremented by the product of the points traversed per segment number, Q, and the amplitude value of the test code point as stored in cell VAL(Q) of variable array 14VA2. Similarly, in step 15.11, regression constant register RG2 is incremented by the amplitude value of the current test code point stored in VAL(Q). In steps 15.12 and 15.13, the regression contant registers RG3 and RG4 are incremented by Q and $Q^2$, respectively.

In steps 15.14-15.16, the appropriate regression constant registers are incremented as each test code point in the segment is processed. Thereafter, in step 15.17, the slope value to be set into array SL(P) is determined by means of a well known regression equation expression shown in step 15.17. According to the expression, the product of registers RG2 and RG3 is substracted from a product of the contents of register RG1 with Z, the number of points per segment, and the result divided by the square of the contents of register RG3 subtracted from the product of the contents of registers RG4 and Z. The resultant slope is, in step 15.18, accumulated by segment number in cell SLA(P) of array 14VA9 for later use in noise value calculations. Thus, for each segment number, P, a cumulative slope is derived over M cycles.

By similarly well known regression techniques, the intercept, i.e., the point at which a regression line such as 5RGR2 intersects a line parallel to the amplitude axis at the boundary between segments 4 and 1 (see FIG. 5), is determined by the expression in step 15.19 and set into cell INT(P) of variable array 14A7, the intercept array. In that expression, the product of cell SL(P) and register RG2 is substracted from the value of register RGR3 and the result is divided by Z. In addition, intercepts are thereafter accumulated in step 15.20 for each segment number, over M cycles, in cell INTA(P) of array 14VA8, the intercept accumulation array. The slope derived in step 15.17 and stored in cell SL(P) is utilized in step 12.7 for variance processing in the manner previously described in the first embodiment. Although, average slope line determination, in the alternate embodiment, is based on regression methods, steps 12.2, 12.11 and 12.12 relating to the updating of the initial value stored in VAL(0), are still necessary so that the variance evaluations of step 12.7 may be carried out. Specifically, when Q, the index number, is 1, step 12.7 requires that a reference point for VAL(Q) be established at VAL(Q-1) i.e., VAL(0), so that a piecewise slope may be ascribed to the first test code point in the segment.

FIG. 16 shows the changes to be made in FIG. 13 of the flow diagram of the first embodiment wherein step 16.26 is substituted for step 13.26 in the first embodiment. As previously noted, there are now four, rather than two, noise calculations. The value of noise near the crossing of the time axis by waveform 5F3 in segment 1 is simply the accumulated intercept value stored in cell INTA(P) of variable array 14VA8, averaged over M cycles for a given waveform frequency. Similarly, in segment 3, the intercept of the regression line for segment 3 (not shown) on the boundary between segments 3 and 4 provides a measure of noise.

It is noted with respect to segments 1 and 3 that the time axis crossing at which noise levels are measured occurs at the beginning of those segments rather than at their end. Accordingly, in step 16.26, if K is 1 or 3, the first multiplicative expression $[(K-1)(K-3)/(2K-5)]$ is equal to 0 and all that need be derived is the average intercept value INTA(K)/M. Conversely, when noise is being determined with respect to segments 2 and 4, the time axis crossing where noise is to be measured occurs at the end of those segments rather than at their beginning. Accordingly, noise values for segments 2 and 4 are ascertained, not with respect to the intersection of the regression line and a line parallel to the amplitude axis at the beginning of the segment, but rather at the intersection of the regression line with a line parallel to the amplitude axis placed at the end of the segment and labeled the "Z-intercept line" in FIG. 5. Thus when the segment number K is 2 or 4, the first multiplicative expression in step 16.26, i.e., $[(K-1)(K-3)/(2K-5)]$ has a value of 1. For those two segments, therefore, the first additive portion of the expression in step 16.26 is derived by taking the product between the accumulated slope value stored in cell SLA(K) of array 14VA9 for the given segment and the number of test code points in the segment, adding thereto INTA(K), the accumulated intercept value for that segment, and dividing the result by M. The aforedescribed expression for segments 2 and 4 represents a determination of noise by deriving a Z intercept value for the regressed average slope line.

The second additive expression in step 16.26 is employed for the same purpose as is the second additive factor in step 13.26 of my previous embodiment, i.e., so that the noise level determind at a zero crossing may be taken with respect to its corresponding noise reference line. Accordingly, the expression $[(K^2-5K+7)/(10-4K)]$ has a value of +0.5 for segments 1 and 2 and −0.5 for segments 3 and 4. The expression appropriately takes into accound a noise reference line for the segments traversed both above and below the time axis. The result of the expression in step 16.26, is placed in the appropriate ones of cells OA(K), the observed amplitude array and step 13.27 is then implemented.

Additionally, in my alternate embodiment step 16.29 is substituted for step 13.29 because K, the noise amplitude index, now ranges from 1 through 4, rather than from 1 to 2. Thereafter, either step 13.30 or 13.31 is carried out.

It will be apparent to those of ordinary skill in the art that numerous modifications of the illustrative embodiments herein may be made without departing from the spirit and scope of the invention.

I claim:

1. A method of testing a PCM channel bank arrangement (10) having
    a time division multiplex line (1T1) serving a plurality of PCM channels;
    a plurality of analog lines (11-34);
    a plurality of channel units (151-174) each coupling one of said PCM channels on said multiplex line (1T1) with one of said analog lines (11) and each having a receive path (12A) wherealong PCM signals are converted to analog signals, a transmit path (13A) wherealong analog signals are converted to PCM signals and a loop-around path (127) coupling said receive and said transmit paths (12A, 13A); and
    a testing controller (105) coupled to said transmit path (12A) and said receive (13A) path of each of said channel units (151-74), the method
    characterized by the steps of
    circulating from said testing controller (105) via said loop-around path (127) and back to said testing controller (105) a sequence of prescribed PCM test code words, each said word defining an amplitude magnitude of a waveform having piecewise linearly positive and negative sloping portions; and
    evaluating the circulated test code words for undesirable levels of signal degradation.

2. The method of claim 1
further characterized in that
said circulating comprises transmitting from said testing controller (105) via said loop-around path (127) and back to said controller (105) a plurality of sequences of prescribed PCM test code words and each said word of each of said sequences defining an amplitude magnitude of a triangularized waveform having said piecewise linear positive and negtive sloping positions.

3. The method of claim 2
further characterized in that
said circulating further comprises the steps of:
generating at said testing controller (105) onto said one of said PCM channels said plurality of sequences of prescribed PCM test code words; and
looping each of said generated test code word sequences back to said testing controller (105) via said receive path (12A), said loop-around path (127) and said transmit path (13A) of the one of said channel units (151) coupled to said one of said PCM channels.

4. The method of claim 3
further characterized in that
said evaluating further comprises the steps of:

averaging said characteristic values at said testing controller (105) over said looped plurality of test code word sequences; and displaying an indication at said testing controller (105) that said one of said channel units (11) is defective when any one of said looped average characteristic values differs from a corresponding one of expected average characteristic values by more than a corresponding one of expected tolerances wherein said expected values and said expected tolerances are prestored in said testing controller (105).

5. The method of claim 2 wherein each of said channel units (151–174) includes
- a decoder (121), a first lowpass filter (122) and a first gain control circuit (123) comprising said receive path (12A);
- a second gain control circuit (124), a second lowpass filter (125) and a coder circuit (126) comprising said transmit path (13A);
- a hybrid circuit (127) coupling said receive path (12A) and said transmit path (13A) and having as its output said one of said analog lines (11); and
- a balance network connected to said hybrid circuit for maintaining transmission balance between said transmit and receive paths (12A, 13A) and said one of said analog lines (11)

characterized in that said looping comprises the steps of decoding each of said prescribed PCM test code word sequences at said decoder circuit (121) into a set of PAM signals;

filtering said set of PAM signals at said lowpass filter (122) into continuous analog signals;

level adjusting said continuous analog signals at said first gain control circuit (123);

sending said level adjusted analog signals via said loop-around path (127);

readjusting the level of said analog signals received from said loop-around path (127) at said second gain control circuit (124);

band limiting said readjusted analog signals at said second lowpass filter (125); and reencoding said band limited signals at said coder (126) into said looped PCM test code word sequences.

6. The method of claim 5 wherein said channel bank arrangement (10) further comprises
- a receive buffer (101) coupled to said multiplex line (1T1);
- a demultiplexer circuit (107) coupled between said receive buffer (101) and said receive path (12A) of said each of said channel units (11–34);
- a channel unit control processor (102) coupled to said receive buffer (101) and said testing controller (105) for identifying each of said PCM channels; and
- a code generator (104) coupled between said testing controller (105) and said receive buffer (101)

further characterized in that said looping is immediately preceded by the steps of:

loading said generated test code words from said testing controller (105) into said code generator (104);

notifying said code generator (104) from said channel unit control processor (102) that said one of said PCM channels has been identified;

transferring said each of said generated test code word sequences from said code generator (104) into said receive buffer (101) upon receipt of said notification; and sending each of said generated test code word sequences from said receive buffer (101) via said demultiplexer (107) to said receive path (12A) of said one of said channel units (151).

7. The method of claim 6 wherein said channel bank arrangement further includes
- a transmit buffer (103) coupled to said multiplex line (1T1) and to said channel unit control processor (102);
- a multiplexer circuit (108) coupled between said transmit buffer (103) and said transmit path (13A) of said each of said channel units (151–174); and
- a code receiver (106) coupled between said testing controller (105) and said transmit buffer (103)

further characterized in that said looping is immediately followed by the steps of recovering each of said looped test code word sequences at said transmit buffer (103) via said multiplexer circuit (108) from said transmit path (13A) of said one of said channel units (151);

signaling said code receiver (106) from said channel unit control processor (102) that said one of said PCM channels has been identified;

shifting each of said recovered looped sequences from said transmit buffer (103) to said code receiver (106) upon receipt of said signaling;

and storing each of said recovered looped sequences of said code receiver (106) in said testing controller (105).

8. The method of claim 7 characterized in that said testing controller (105) comprises an accumulator register for storing amplitudes of PCM test code words to be generated and further characterized in that said generating further comprises the steps of:

initializing said accumulator register to a first amplitude reference code word;

preselecting the number of bits in each of said prescribed test code words;

selecting the frequency of said triangularized waveform cycle from a prescribed range of frequencies;

setting a uniform amplitude step size separating amplitude values of each of said prescribed test code words for each of said plurality of generated sequences in accordance with said selected frequency; and establishing the number of test code words required for an amplitude plot traversal of said triangular waveform cycle in accordance with said number of bits and said selected cycle frequency.

9. The method of claim 8 characterized in that said generating further comprises the steps of:

iteratively updating prior to the execution of said step of loading said generated test code words into said code generator (104) said initialized accumulator register amplitude code word by said uniform amplitude step size to form an amplitude sequence traversing said triangularized waveform cycle.

10. The method of claim 9 further characterized in that said triangularized waveform cycle is divisible into four one-quarter cycle segments each traversed by a number of generated words per segment equal to one-fourth of said number of words required for traversal of said cycle and said updating step comprises the steps of:

incrementing said accumulator register amplitude by said uniform amplitude step size a number of times equal to said number of words per segment for a traversal of a first positive-amplitude, positive-slope segment;

decrementing said accumulator register amplitude by said step size a number of times equal to said number of words per segment for a traversal of a second positive-amplitude, negative-slope segment;

adjusting said accumulator register to a second amplitude reference value;

further decrementing said accumulator register amplitude by said step size a number of times equal to said number of words per segment for a traversal of a third negative-amplitude, negtive-slope amplitude;

incrementing said accumulator register amplitude by said step size a number of times equal to said number of words per segment for a traversal of a fourth negative-amplitude, positive-slope segment; and readjusting said accumulator register amplitude to said first amplitude reference value.

11. The method in accordance with claim 10 characterized in that
said generating step further comprises the step of
first repeating said updating step a prescribed number of times for a traversal of said plurality of triangularized waveform cycles at said selected frequency.

12. The method in accordance with claim 11 further characterized in that
said generating step further comprises the step of:
further repeating all of said foregoing steps comprising said generating step except said initializing and said preselecting steps for each said cycle frequency in said prescribed range of frequencies.

13. The method of claim 12 further characterized in that
said averaging comprises the steps of:
setting the number of looped test code words per segment in accordance with said number of bits and said selected frequency of said prescribed range of frequencies;
buffering each of said looped sequences of test code words stored in said testing controller (105) into four test code word groups each corresponding in sequence to one of said four segments of said waveform cycle and each comprising said number of looped words per segment; and
reconverting each of said looped test code word groups into a set of amplitude values traversing said corresponding segment.

14. The method of claim 13 further characterized in that
said first, said second, said third and said fourth segments of said waveform cycle each have a segment number equal to one, two, three and four, respectively, and said averaging step further comprises the step of
accumulating by said segment number the last value of each said set of reconverted amplitude values over said prescribed number of waveform cycles.

15. The arrangement in accordance with claim 14 further characterized in that
said averaging further comprises the steps of
determining an average slope of an amplitude plot of said segments traversed by said each said set of amplitude values;
differencing consecutive pairs of said each said set of amplitude values for deriving therefrom a corresponding set of slope values; and
accumulating by said segment number for each said set of amplitude values a sum of the variances between each of said set of slope values and said determined average slope over said prescribed number of waveform cycles.

16. The method of claim 15 further characterized in that
the first and second of said characteristic values of said waveform cycle are an average positive peak amplitude value and an average negative peak amplitude value, respectively,
said averaging further comprising the steps of:
dividing said accumulated last value of each said set of amplitude values of said first segment by said prescribed number of waveform cycles for a determination of said average positive peak amplitude value; and
repeating said dividing step for said third segment for a determination of said average negative peak amplitude value.

17. The method of claim 16 further characterized in that
the third and fourth of said characteristic values are an average positive slope variance value and an average negative slope variance value respectively,
said averaging step further comprising the steps of:
summing said accumulated sums of said variances of said first segment with said accumulated sums of said variances of said fourth segment,
dividing said summed accumulations by twice said prescribed number of waveform cycles for a determination of said average positive slope variance value;
repeating said summing step for said second and said third segments; and
repeating said last-mentioned dividing step for a determination of said average negative slope variance value.

18. The method of claim 17 further characterized in that
said step of initializing said accumulated register included in said generating step is immediately followed by the step of
first encoding said initializing first amplitude reference value in said accumulator register into an initial test code word prior to the execution of said step of loading said generated test code words into said code generator (104); and
said step of setting said number of looped test code words per segment included in said averaging step is immediately preceded by the step of
first reconverting said looped initial test code word into an initial amplitude value associated with said each said set of amplitude values.

19. A method of claim 18 further characterized in that
said step of differencing said consecutive pairs of each said set of amplitude values further comprises the step of
decrementing said first value of said each said set of amplitude values by said initial amplitude value for a determination of the first of said set of slope values derived from said each said set of amplitude values.

20. The method of claim 19 further characterized in that
said step of accumulating said sum of said variances is immediately followed by the steps of:
resetting said initial amplitude value to the sum of said last value of said each said set of amplitude values and a shifting value; and
adjusting said shifting value to 0 when said set of amplitude values following said each said set of amplitude values traverses said first and said third segments, to 1 when said following set of amplitude values traverses said second segment and to $-1$ when said following set of amplitude values traverses said fourth segment.

21. The method of claim 20 further characterized in that
said step of determining said average slope for said each said set of amplitude values further comprises the steps of:
decrementing said last of said each of said set of amplitude values by said initial amplitude value; and
dividing said decremented last value by said number of looped test code words per segment.

22. The method in accordance with claim 21 further characterized in that
the fifth and sixth of said characteristic values of said corresponding waveform cycle are first and second zero crossing amplitudes respectively, and
said averaging step further comprising the steps of:
dividing said accumulated last value of each set of amplitude values of said fourth segment by said prescribed number of waveform cycles;
decrementing said last mentioned divided accumulated last value of said fourth segment by said second reference value; for a determination of said first zero crossing value;
repeating said last-mentioned dividing step for said second segment; and
decrementing said last-mentioned divided accumulated last value for said second segment by said first reference value for a determination of said second zero crossing value.

23. The method of claim 20 further characterized in that
said step of determining said average slope further comprises the steps of:
fitting a straight line to said amplitude plot of said segment traversed by said each said set of amplitude values; and
setting said average slope equal to the slope of said fitted straight line.

24. The method of claim 22 further characterized in that
said step of determining said average slope further comprises the steps of:
accumulating by said segment number said average slope of said each said set of amplitude values over said prescribed number of waveform cycles;
setting an intercept value equal to the amplitude value at an intersection between said straight line and an amplitude axis line at the beginning of said amplitude plot of said each said set of amplitude values; and
accumulating by said segment number said intercept value of said each said set of amplitude values over said prescribed number of waveform cycles.

25. The method of claim 24 further characterized in that
the fifth, sixth, seventh and eighth of said characteristic values are first, second, third and fourth zero crossing amplitudes, respectively, and said averaging step further comprises the steps of:
dividing said accumulated intercept values of said first segment by said prescribed number of waveform cycles;
decrementing said divided intercept values by said first reference value for a determination of said first zero crossing amplitude;
repeating said last-mentioned dividing and decrementing steps for said second segment;
adding to said divided decremented intercept values of said second segment the product of said accumulated average slope of said second segment and said number of looped test code words per segment divided by said prescribed number of waveform cycles for a determination of said second zero crossing amplitude;
repeating said step of dividing said accumulated intercept values for said third segment;
decrementing said divided intercept values for said third segment by said second reference value for a determination of said third zero crossing amplitude;
repeating said last-mentioned steps of dividing said accumulated intercept values and of decrementing by said second reference value for said fourth segment; and
repeating said last-mentioned adding step for said fourth segment for a determination of said fourth zero crossing amplitude.

26. The method of claims 22 or 25 further characterized in that
said averaging step further comprises the step of
repeating all of said foregoing steps comprising said averaging step for each said cycle frequency of said prescribed range of frequencies.

27. The method of claim 24 characterized in that
said channel bank arrangement (20) comprises a selector circuit (210) coupled to said testing controller (205) and responsive to a toggle signal therefrom for enabling said loop-around path of said each of said channel units (251-274) to be tested wherein said selector circuit (210) includes a plurality of bistable memory devices (2F1-2F24) each corresponding to one of said plurality of channel units (251-274);
said loop-around path comprises a first AND gate (2G31) having a first input coupled to said first gain control circuit (223), a second input coupled to a first output of said bistable device (2F1) corresponding to said one of said channel units (251) to be tested and an output connected to said second gain control circuit (224); and
said channel unit further comprises a second AND gate (2G1) having a first input connected to said first gain control circuit (223), a second input connected to a second output of said corresponding bistable device (2F1) and an output connected to said hybrid circuit (227) and further characterized in that
said generating step is preceded by the steps of:
transmitting a toggle signal from said testing controller (205) to said bistable device (2F1) corresponding to said one of said channel units (251) to be tested; and toggling said corresponding bistable device (2G1) in response to said toggle signal to disable said output of second AND gate (2G1) and said hybrid circuit (227) and to enable said output of said first AND gate (2G31) and said loop-around path for sending said analog signals thereacross.

* * * * *